United States Patent [19]

Wright et al.

[11] Patent Number: 5,055,998
[45] Date of Patent: Oct. 8, 1991

[54] INTERMEDIATE SPREADSHEET STRUCTURE

[75] Inventors: Terrence Wright, Tyngsboro; Scott Mayo, Clinton, both of Mass.; Ray Lischner, Pittsburgh, Pa.

[73] Assignee: Wang Laboratories, Inc., Lowell, Calif.

[21] Appl. No.: 206,638

[22] Filed: Jun. 14, 1988

Related U.S. Application Data

[63] Continuation-in-part of Ser. No. 679,675, Dec. 10, 1984, Pat. No. 4,751,740.

[51] Int. Cl.$^5$ .................................................. G06F 5/00
[52] U.S. Cl. ................................. 364/200; 364/286; 364/262.9
[58] Field of Search ......................... 364/200, 900, 300

[56] References Cited

U.S. PATENT DOCUMENTS

| | | | |
|---|---|---|---|
| 4,633,430 | 12/1986 | Cooper | 364/900 |
| 4,661,904 | 4/1987 | Kurakake et al. | 364/200 |
| 4,713,754 | 12/1987 | Agarwal et al. | 364/200 |

*Primary Examiner*—Thomas M. Heckler
*Attorney, Agent, or Firm*—Michael H. Shanahan

[57] ABSTRACT

An improved intermediate spreadsheet structure for representing n-dimensional spreadsheets being interchanged among spreadsheet programs. The intermediate spreadsheet structure represents a spreadsheet as a set of nested segments. Each non-empty cell of the spreadsheet is represented by a cell segment. All of the cells belonging to a first-dimensional element of the spreadsheet such as a row are contained in a vector segment representing the row; All of the vector segments representing elements of a second-dimensional element such as a matrix are contained in a vector segment representing the second-dimensional element. The same type of nesting is used with all higher-dimensional elements. Each segment further contains descriptors which define certain aspects of the segment's content. The cell segments may further contain an expression control and descriptors belonging to the expression control which define an expression. The descriptors belonging to the expression control define the expression's operands and an operator. Operands may be constants, references to other cells of the spreadsheet, or another expression. Nesting of expressions is permitted to any practical depth. Other aspects of the spreadsheet specified by descriptors include the manner in which the spreadsheet and its contents are to be formatted when it is displayed, access control for portions of the spreadsheet, the data types of values, and rules for the order in which have the values of the cells in the spreadsheet are computed.

16 Claims, 15 Drawing Sheets

DOCUMENT TRANSLATION SYSTEM DURING TRANSLATION FROM SOURCE STRUCTURE TO INTERMEDIATE STRUCTURE

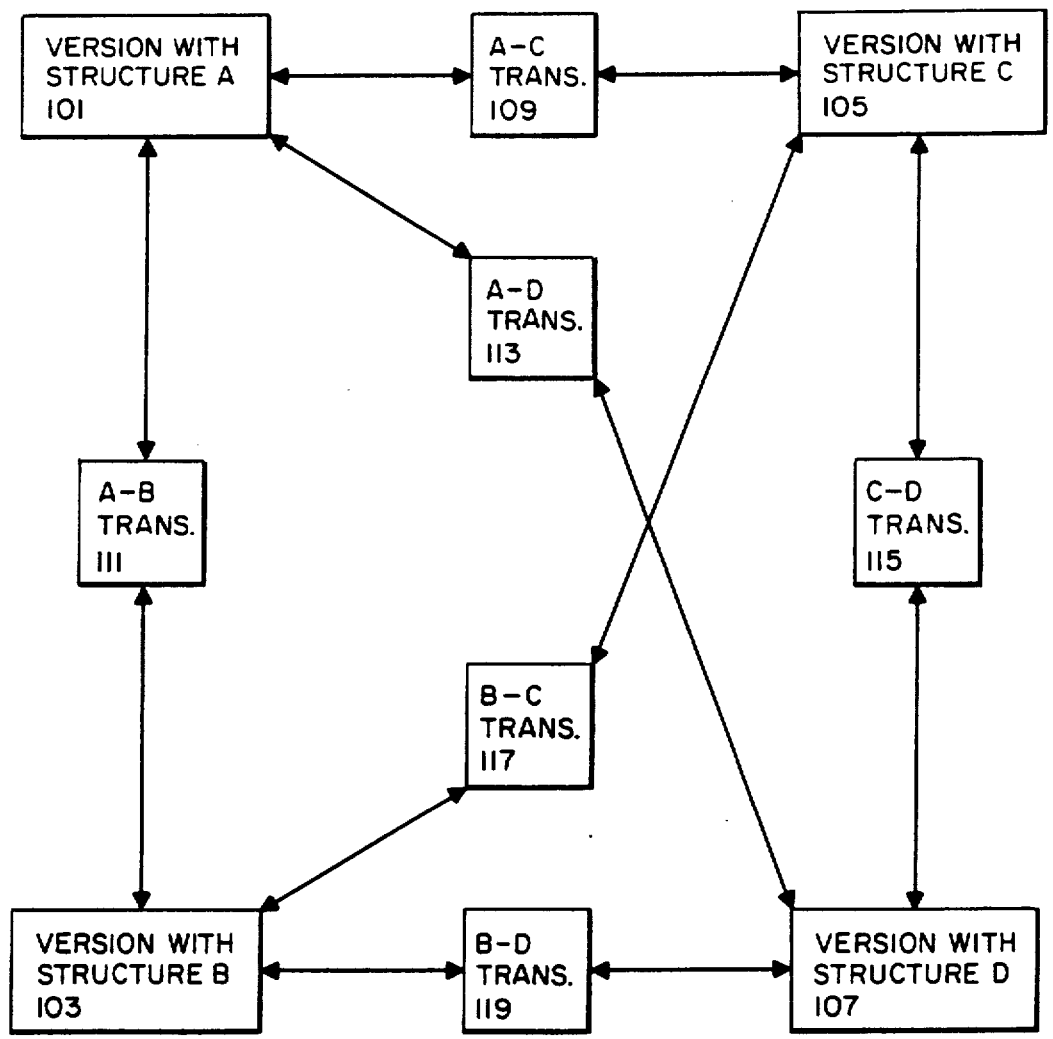
FIG. 1: PRIOR-ART DOCUMENT STRUCTURE TRANSLATION

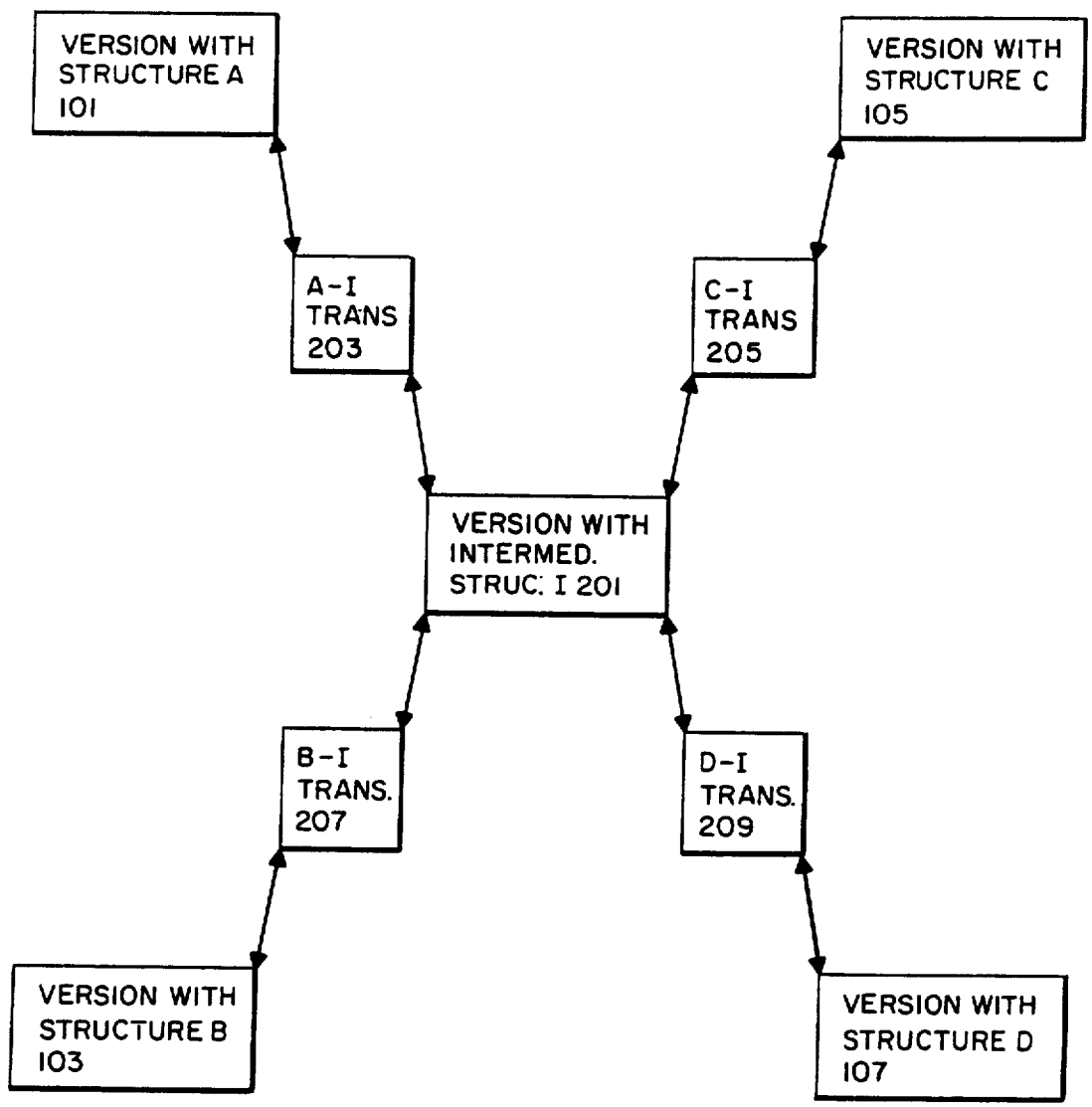
FIG. 2 DOCUMENT STRUCTURE TRANSLATION IN THE PRESENT INVENTION

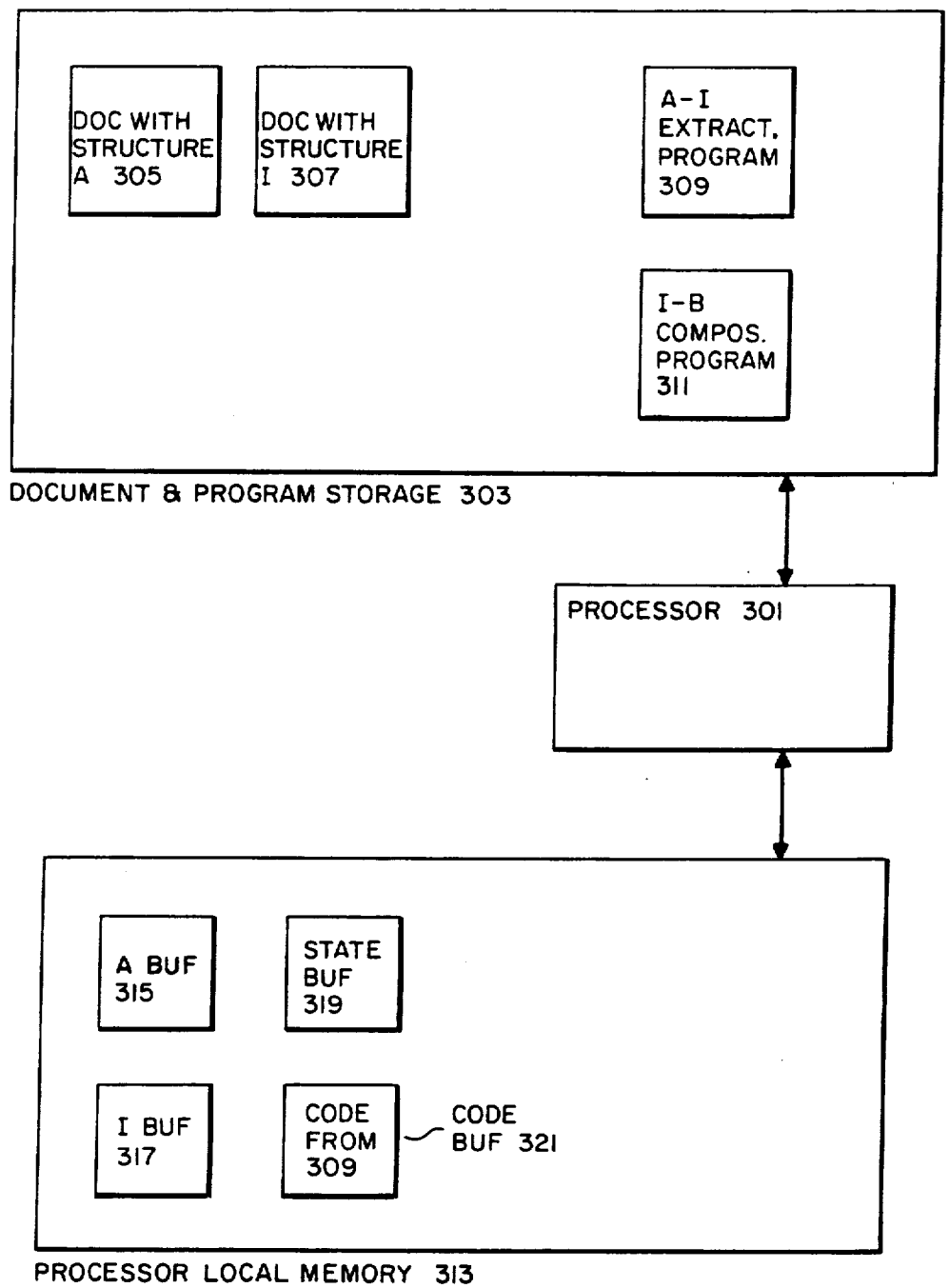
FIG. 3: DOCUMENT TRANSLATION SYSTEM DURING TRANSLATION FROM SOURCE STRUCTURE TO INTERMEDIATE STRUCTURE

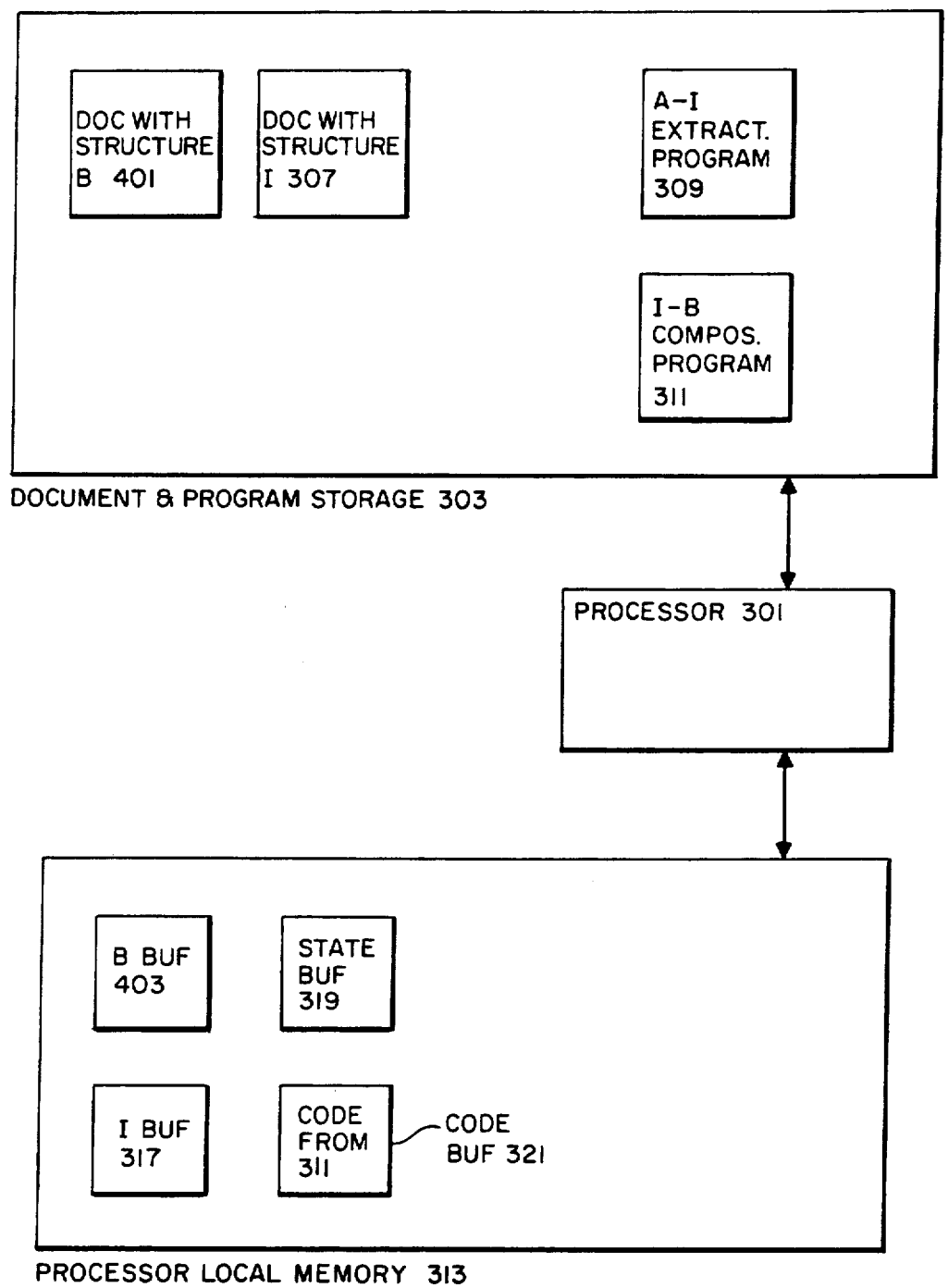
FIG. 4: DOCUMENT TRANSLATION SYSTEM DURING TRANSLATION FROM INTERMEDIATE STRUCTURE TO DESTINATION STRUCTURE

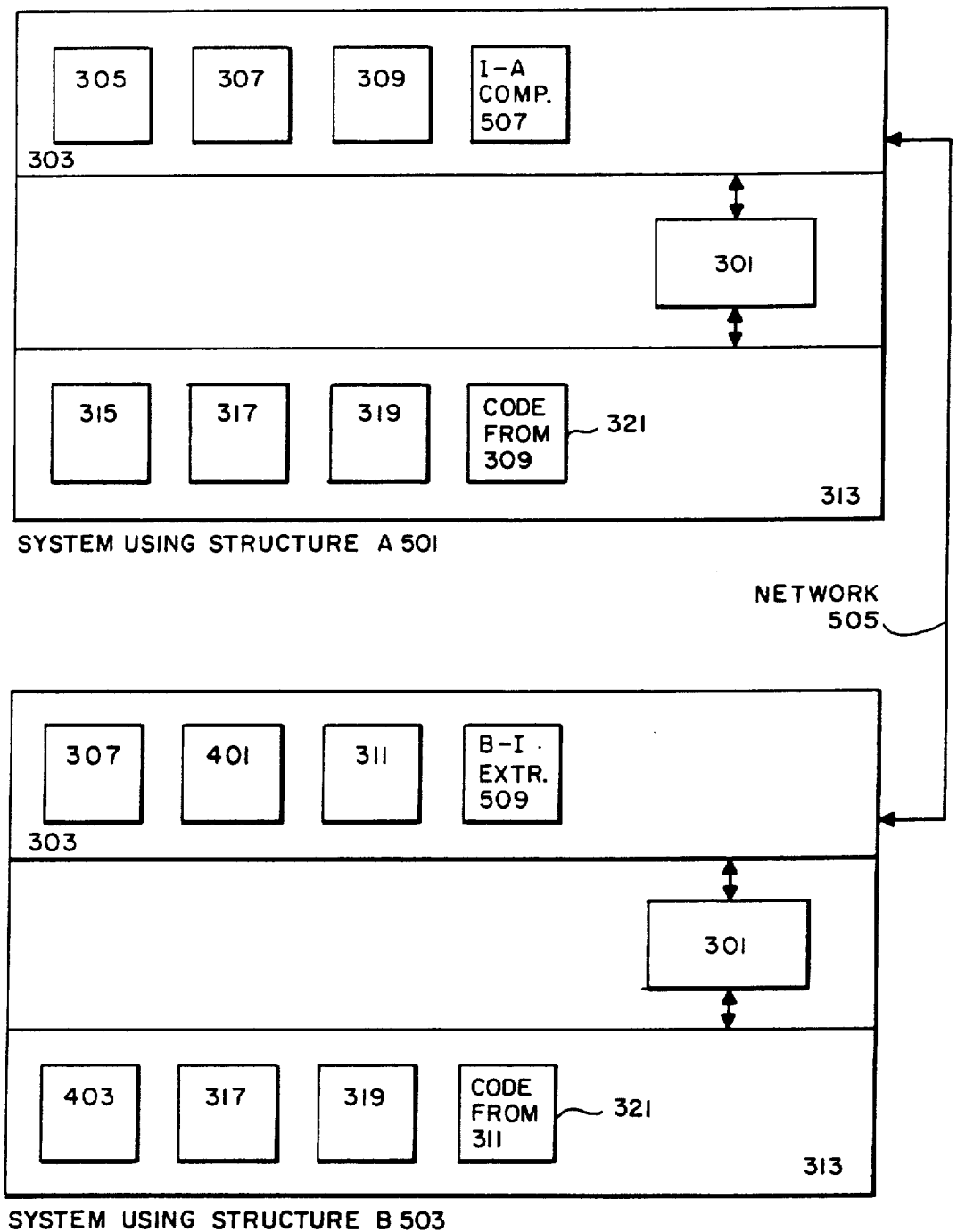
FIG. 5: DOCUMENT TRANSLATION SYSTEM IN A NETWORK

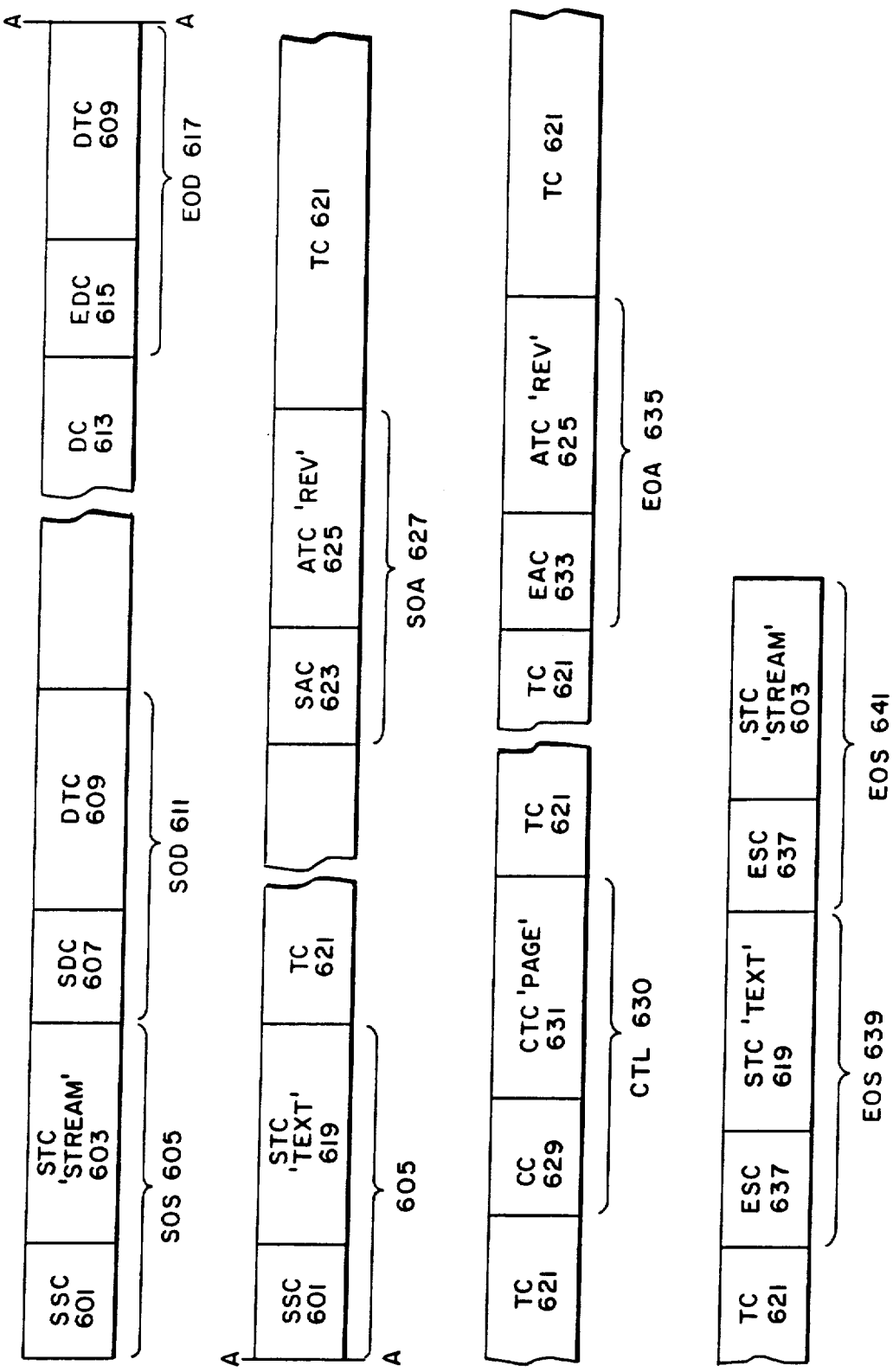
FIG. 6: INTERMEDIATE DOCUMENT STRUCTURE OVERVIEW

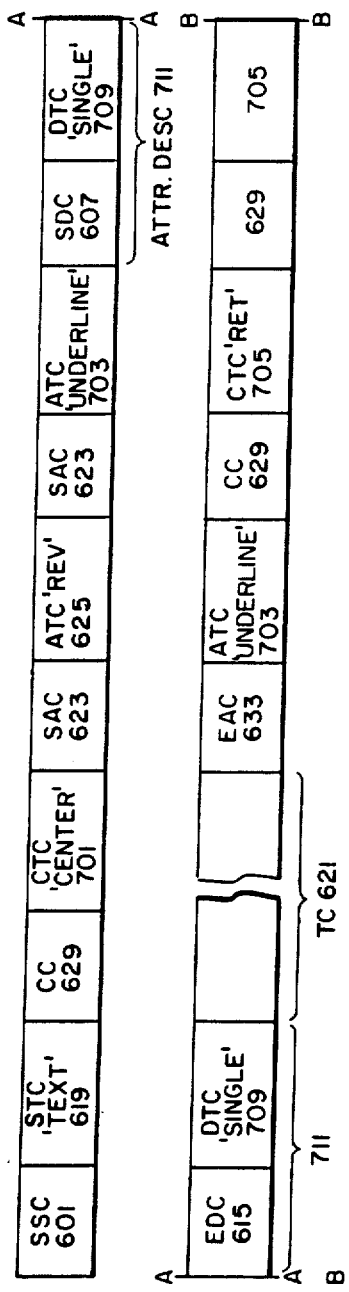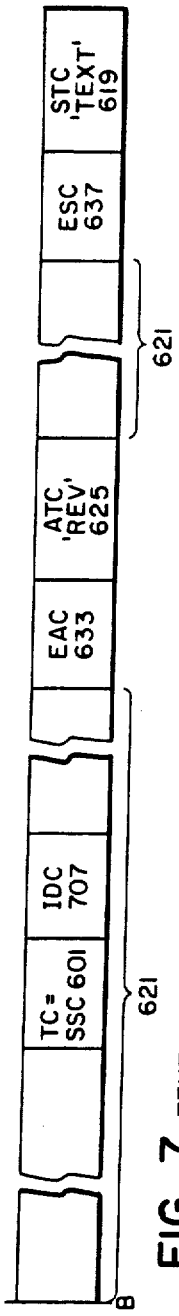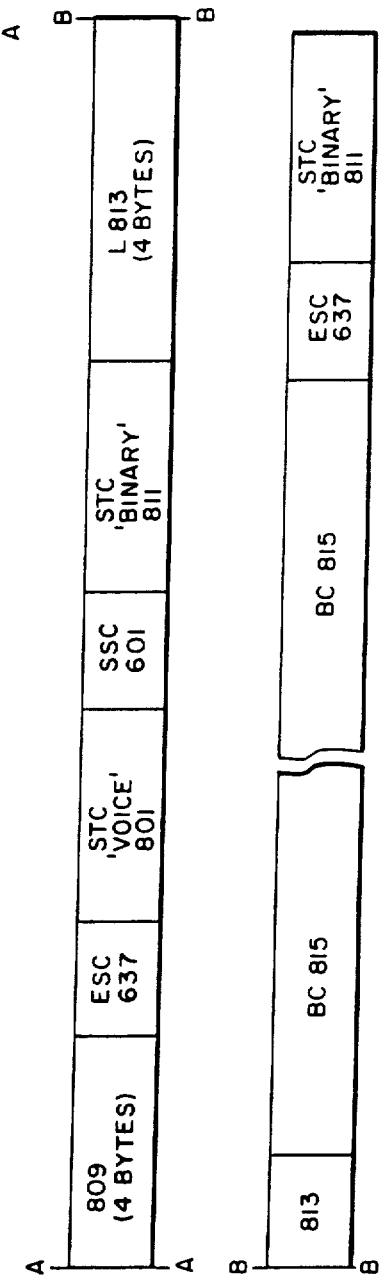
FIG. 7: TEXT SEGMENT DETAIL
FIG. 8: VOICE AND BINARY SEGMENT DETAIL

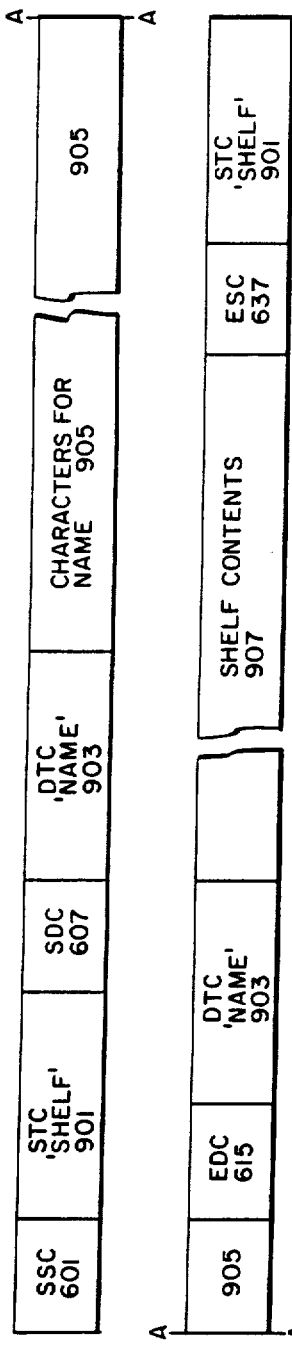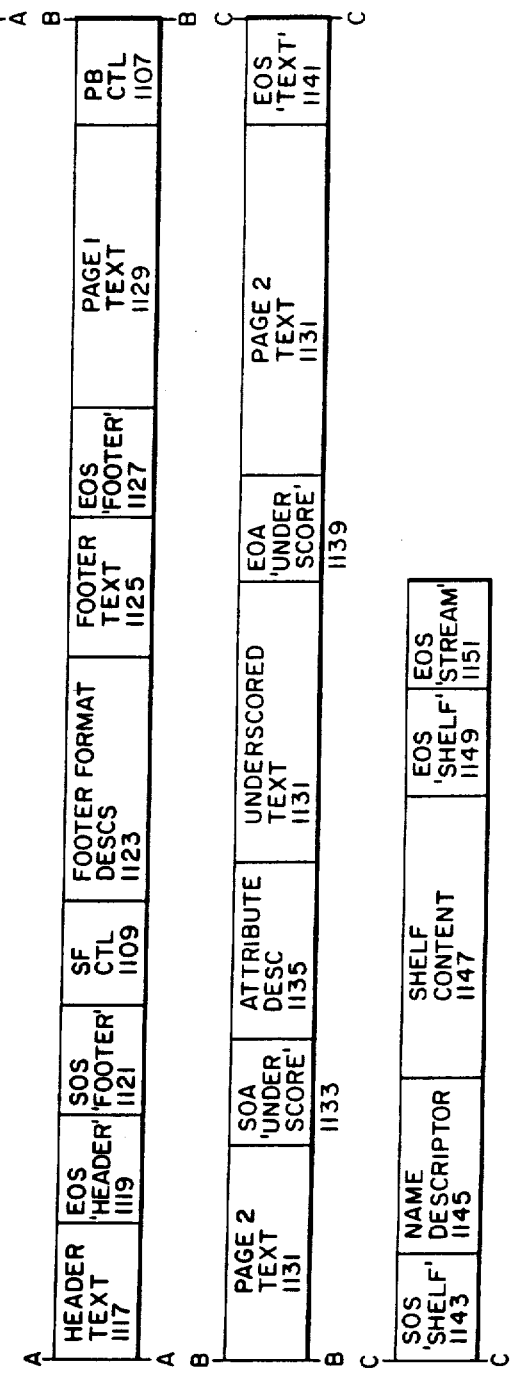

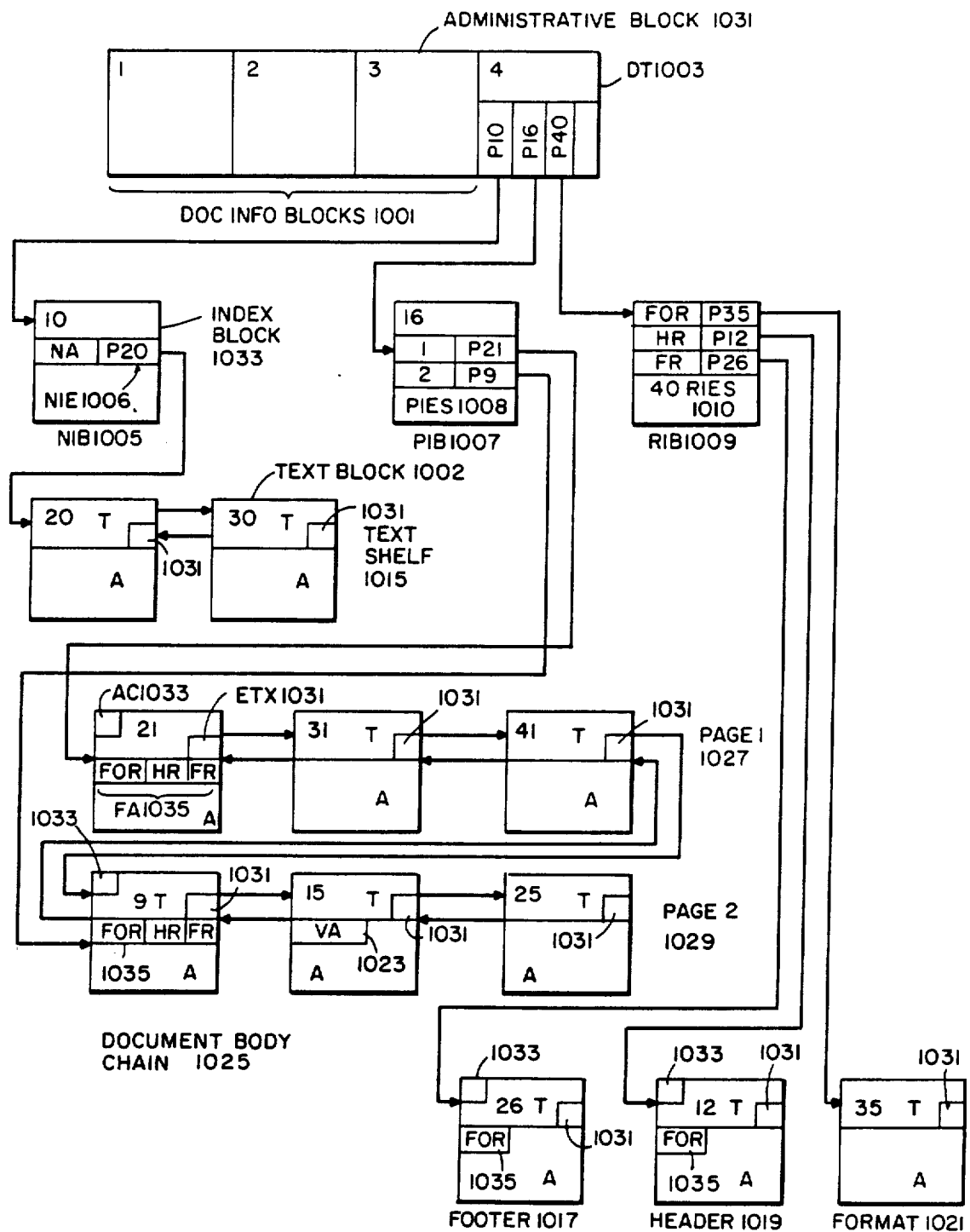
FIG. 10 : DOCUMENT WITH PRIOR-ART STRUCTURE

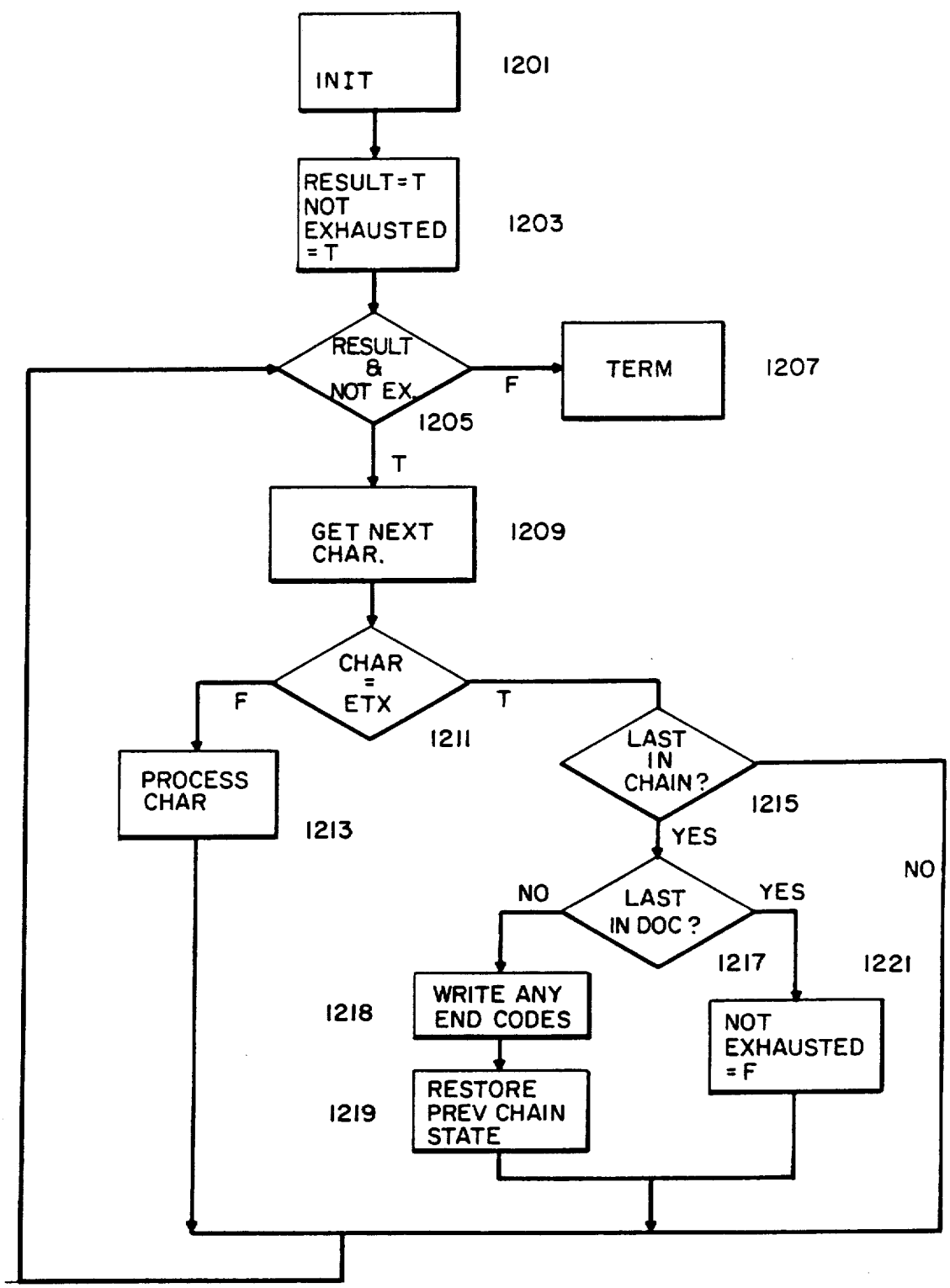
FIG. 12: MAIN TRANSLATION LOOP

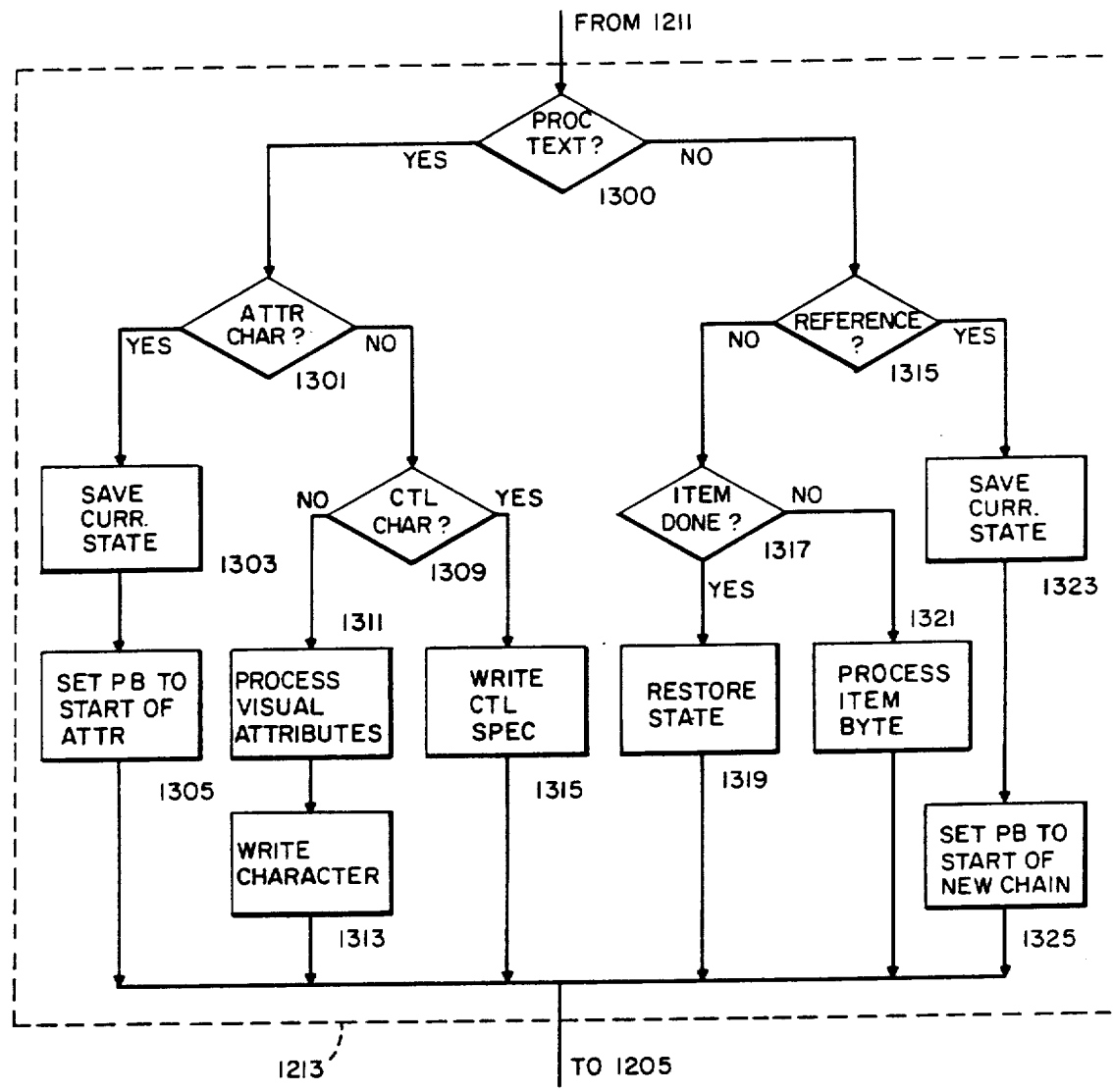
FIG. 13: DETAIL OF PROCESS CHAR 1213

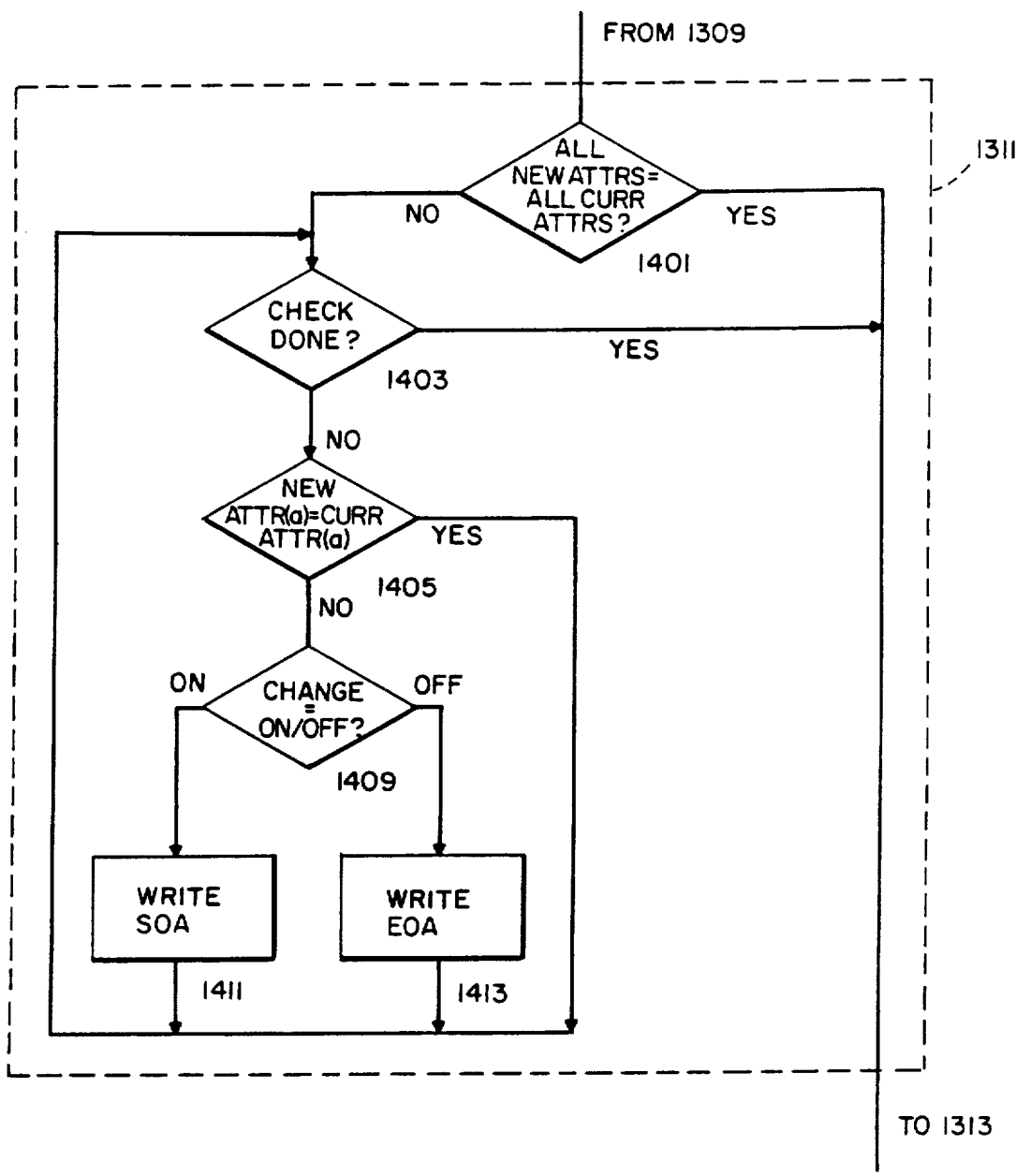
FIG. 14: ATTRIBUTE PROCESSING DETAIL

FIG. 15: DISPLAY OF 2-DIMENSIONAL SPREAD SHEET 1501

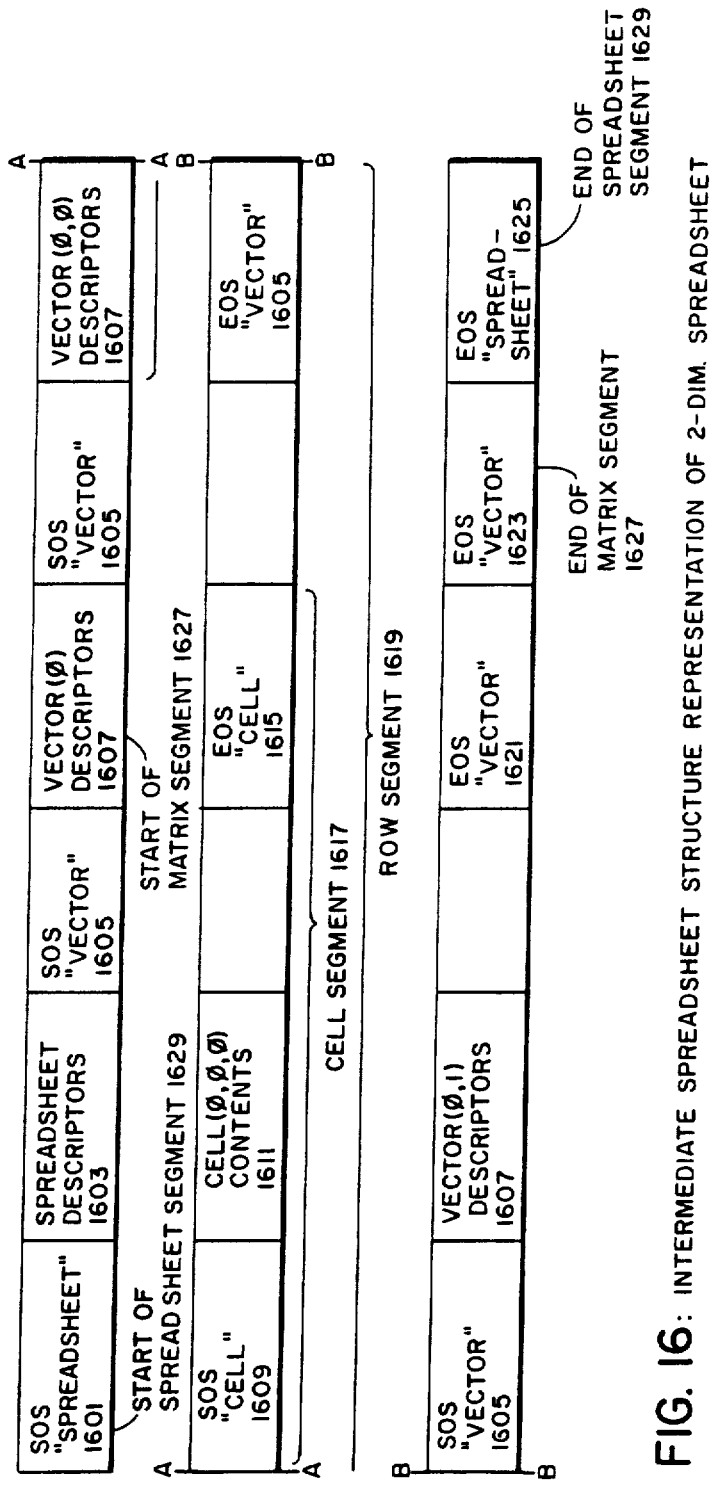
FIG. 16: INTERMEDIATE SPREADSHEET STRUCTURE REPRESENTATION OF 2-DIM. SPREADSHEET
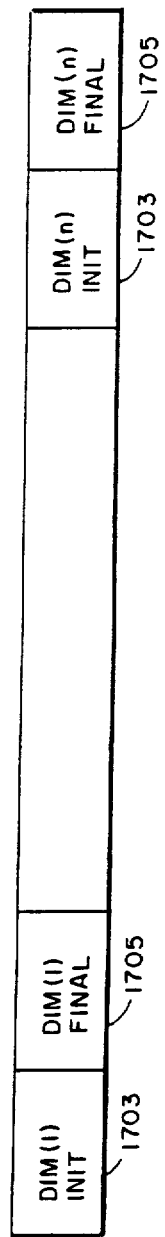
FIG. 17: CELL ADDRESS DESCRIPTORS 1701

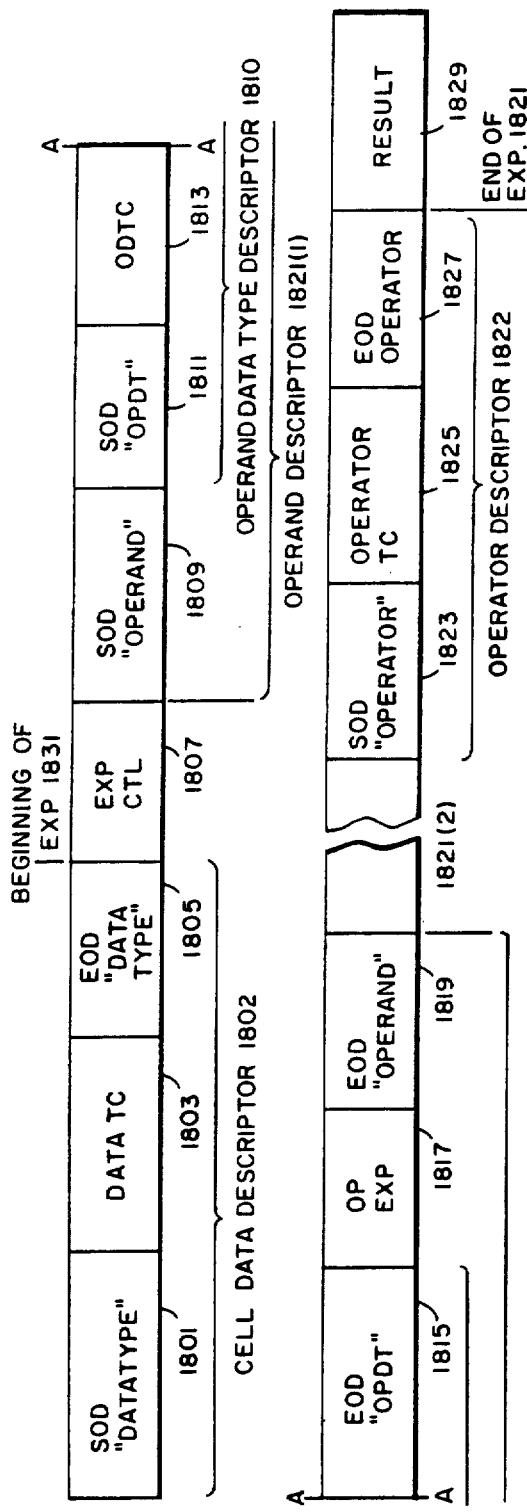
FIG. 18: DETAIL OF CELL CONTENTS 1611
FIG. 19: SIMPLE EXAMPLE SPREADSHEET

INTERMEDIATE SPREADSHEET STRUCTURE

CROSS REFERENCES TO RELATED APPLICATIONS

This application is a continuation-in part of U.S. Ser. No. 679,675, filed 12/10/84, which issued on 6/14/88 as U.S. Pat. No. 4,751,740.

BACKGROUND OF THE INVENTION

1. Field of the Invention

The present invention relates to structures used to transfer formatted information between data processing systems, and more particularly to structures used to transfer a spreadsheet from one spreadsheet processing system to another.

2. Description of the Prior Art

Spreadsheets may be created and manipulated using many different kinds of spreadsheet programs. Each program creates a form of spreadsheet which is specific to that program. Thus, if one person creates a spreadsheet and another who has a different spreadsheet program wishes to use the spreadsheet, the spreadsheet must be translated from the structure (the source structure) required by the first spreadsheet program to the structure (the target structure) required by the second spreadsheet program. Of course, programs can be written which perform the translation, but there must be a program for each source structure—target structure pair. In order to simplify the translation process, spreadsheet program makers developed intermediate spreadsheet structures which were specifically adapted to the exchange of information between spreadsheet programs. With such structures, it was only necessary to provide programs which translated both to and from a given spread sheet structure and the intermediate structure. An example of such an intermediate structure is the SYLK (Symbolic Link) file format developed for the Multiplan spreadsheet. The SYLK file format is described in detail in Appendix C of the *Wang PC Multiplan Reference Guide*, 1st ed., Dec. 1982, Wang Laboratories, Inc., Lowell, MA, manual number 700-8016.

While the SYLK file format works for its intended purpose, the further development of spreadsheet programs has revealed certain limitations. For example, the SYLK file format can handle only two dimensional spreadsheets, is limited to the expressions and the expression notation found in the Multiplan spreadsheet, has a relatively small set of data types, and offers only limited control of spreadsheet formats. Moreover, the SYLK file format is not easily expanded to deal with new developments in spreadsheet programs. It is an object of the present invention to provide an intermediate spreadsheet structure which can represent spreadsheets of any dimensionality, which can represent any expressions or formats defined for spreadsheets, and which is easily expandable to deal with new developments.

SUMMARY OF THE INVENTION

The intermediate spreadsheet structure of the present invention may be used to represent spreadsheets having elements with a maximum dimensionality of n. The intermediate spreadsheet structure comprises a cell segment representing each non-empty cell in the spreadsheet, at least one first dimensional vector segment which represents a first dimensional element of the spreadsheet and which contains the cell segments for any non empty cells belonging to that element, and for each additional dimension m where m is less than or equal to the maximum dimensionality n, a vector segment for each non empty element of that dimension which represents the non-empty element and which contains vector segments for non-empty elements of the (m-1)th dimension of the spreadsheet.

It is thus an object of the invention to provide improved interchange of spreadsheets among spreadsheet programs.

It is another object of the invention to provide an improved intermediate spreadsheet structure.

It is an additional object of the invention to provide an intermediate spreadsheet structure which can represent a spreadsheet having elements with a maximum dimensionality of n dimensions.

It is a further object of the invention to provide an intermediate spreadsheet structure with improved flexibility and expandibility.

Other objects and advantages of the invention will be understood by those of ordinary skill in the art after referring to the detailed description of a preferred embodiment and the drawings. Particular attention is drawn to those portions of the Description beginning with Section 10 and to FIGS. 15-19.

BRIEF DESCRIPTION OF THE DRAWINGS

FIG. 1 is a block diagram of prior-art translation of document structures.

FIG. 2 is a block diagram of translation of document structures in the present invention.

FIG. 3 is a block diagram of a document translation system during translation from a source structure to an intermediate structure.

FIG. 4 is a block diagram of a document translation system during translation from an intermediate structure to a target structure.

FIG. 5 is a block diagram of a document translation system in a network.

FIG. 6 is an overview of the intermediate document structure of the present invention.

FIG. 7 is a detail of a text segment in the intermediate document structure of the present invention.

FIG. 8 is a detail of voice and binary segments in the intermediate document structure of the present invention.

FIG. 9 is a detail of a named text shelf segment in the intermediate document structure of the present invention.

FIG. 10 is a block diagram of a document with prior art structure.

FIG. 11 is the document of FIG. 10 with the intermediate structure of the present invention.

FIG. 12 is a flow chart of a main translation loop for translating documents having the structure of the document of FIG. 10 into the intermediate structure of the present invention.

FIG. 13 is a detailed flow chart of the character processing step in the flow chart of FIG. 12.

FIG. 14 is a detailed flow chart of the attribute processing step in the flow chart of FIG. 13.

FIG. 15 is a diagram of the display of a two-dimensional spreadsheet.

FIG. 16 is a diagram of the representation of a 2 dimensional spreadsheet structure using the intermediate spreadsheet structure of the invention.

FIG. 17 is a diagram of cell address descriptors.

FIG. 18 is a detailed diagram of the contents of a cell.
FIG. 19 is simple example spreadsheet.

DESCRIPTION OF A PREFERRED EMBODIMENT

The following description of a preferred embodiment first describes implementations of the invention in a single stand alone document processing system and in a network of document processing systems. Thereupon, it describes a preferred embodiment of the intermediate document structure, and finally, it provides an example of translation between the preferred embodiment of the intermediate document structure and a prior-art document structure.

1. Stand-alone Translation System of the Present Invention: FIGS. 3 and 4

A block diagram of a stand alone system for document translation according to the present invention is presented in FIG. 3. The document translation system shown in that figure is implemented in a standard multi user document processing system such as the Wang Laboratories, Inc. "ALLIANCE" ( TM ) system. Such a document processing system commonly includes at least a mass storage device such as a disk drive for storing documents and document processing used by the processor to store data and programs while processing a document. In FIG. 3, these components are represented as document and program Storage 303, processor 301, and processor local memory 313. Under control of a program, processor 301 may fetch data and programs from document and program storage 303 to local memory 313, may execute the programs and process the data in local memory as specified by the programs, and may store processed data in storage 303. Other components of the system, not important for the present discussion and therefore not shown in FIG. 3, may include terminals for the users and means for reading and writing floppy disks.

Translation is necessary in a document processing system of the type shown in FIG. 3 when a user of the system wishes to process a document having a document structure different from that used in the document processing system. Such a situation may arise when the user has a copy of the document on a floppy disk made by a different document processing system. In this case, the document must be read from the floppy into storage 303 and then translated into the proper form before further processing is possible. Translation using an intermediate structure takes place in two steps: from the first document structure to the intermediate structure and from the intermediate structure to the second document structure. FIG. 3 shows the document processing system while executing the first step. Storage 303 contains document with structure A 305, document with intermediate structure I 307, and two programs: A-I extraction program 309 and I-B composition program 311. Program 309 is termed an extraction program because it extracts information from a document having structure A and produces a document containing the sam information and having intermediate structure I. Program 311 is termed a composition program because it composes a document having structure B from the information contained in the document having structure I.

During the first step, processor local memory 313 contains four buffers, i.e., areas of memory in which data and programs relevant to the translation operation are stored during the translation operation. A buffer 315 contains the portion of document 305 which is currently being translated into the intermediate structure; I buffer 317 contains the result of the translation of the contents of A buffer 315 into the intermediate structure; state buffer 319 contains data which indicates the current state of the translation operation; code buffer 321, finally, contains the code from program 309 which processor 301 is currently executing.

During translation from structure A to structure I, the system operates as follows: for each portion of document A 305 being translated, processor 301 moves the components of document A s structure containing the portion from storage 303 into A buffer 315. Processor 301 then begins translating the contents of A buffer 315 under control of code from program 309. If code other than what is presently in code buffer 321 is required to perform the translation, that code is copied from program 309 into code buffer 321. As processor 301 translates, it places the result in I buffer 317. When I buffer 317 is full, it is copied to document I 307; similarly, when a portion of document 305 which is not presently contained in A buffer 315 is required, the required portion of document A 305 is copied from storage 303 to A buffer 315.

Variations on the above implementation of the invention will be immediately apparent to one skilled in the art. For example, document processing systems of the kind typified by the "ALLIANCE" generally have relatively small memories 313; consequently, the buffers 315, 317, and 321 will not be large and transfers between storage 303 and these buffers will frequently occur. When implemented in a system such as a general-purpose data processing system with large local memory, the buffers may be large enough to accept an entire document and all of code 309, and transfers between storage 303 and local memory 313 may occur only at the beginning and end of the translation operation. Large systems may also include means for permitting direct transfer of data between storage 303 and memory 313 in such systems, data would be transferred between document 305 and document 307 and buffers 315 and 317 and code from program 309 to buffer 321 without the direct intervention of processor 301. Further, in a multiprogramming system, state buffer 319 may contain state permitting interruption and resumption of a processing operation.

The second step is analogous to the first. FIG. 4 shows the document processing system during this step. The documents involved are the document with structure I 307 which resulted from the first step and a document with structure B which is to be the result of the second step. The program involved is I-B composition program 311. The buffers are I buffer 317, state buffer 319, code buffer 321, and B buffer 403, which contains data destined for document 401. Code buffer 321 contains code from I-B composition program 311. During the translation operation, processor 301 under control of I B composition program 311 reads a portion of document 307 into I buffer 317, translates the contents of I buffer 317 into structure B, and places the result in B buffer 403. When B buffer 403 is full, its contents are written to document 401. Portions of program 311 are copied to code buffer 321 as required to perform the translation operation.

If the document processing system must deal with documents having structures other than structure A, then there must be a program analogous to A-I extraction program 309 for every structure which the document processing system must deal with. Of course, the number of such programs is reduced if all document processing systems adopt the convention that documents on floppy disks are in the intermediate structure. In that case, only two programs are required: I B composition program 311 and a B-I extraction program for translating documents having the B structure into ones having the I structure.

2. Document Translation according to the Present Invention in a Network: FIG. 5

The situation in a networked system in which all documents which are transferred via the network have the intermediate structure is similar to the one which arises when all documents on floppy disks have the intermediate structure. As shown in FIG. 5, each of the systems in the network must have a composition program for translating documents from the intermediate structure into the structure used in the system and an extraction program for translating documents from the structure used in the system to the intermediate structure.

Network 505 of FIG. 5 connects two systems, system 501 using structure A and system 503 using structure B. Each system has storage 303, processor 301, and memory 313. System 501 further has A-I extraction program 309 and I A composition program 507, while system 503 has I B composition program 311 and B I extraction program 509. FIG. 5 shows systems 501 and 503 as they would be set up in the course of a transfer of a document from system 501 to system 503. System 501 first operates under control of A-I extraction program 309 to translate document with structure A 305 into document with structure I 307 in the manner previously described. When the translation is finished, document with structure I 307 is sent via network 507 from system 501's storage 303 to the equivalent storage in system 503. System 503 then operates under control of I-B composition program 311 to translate document 307 into document with structure B 401. In a transfer of a document from system 503 to system 501, the reverse of the above occurs. System 503, operating under control of B-I extraction program 509, translates a document having structure B into its equivalent having structure I. That document is then sent via network 505 to system 501 which, operating under control of I-A composition program 507, translates the document with structure I into one with structure A.

Since all of the documents transferred via network 505 have the intermediate structure I, a given system attached to the network need only have an extraction program for translating the system's document structure into the intermediate structure and a composition program for translating the intermediate structure into the system's document structure. Thus, regardless of the number of kinds of document structures used by systems attached to the network, a given system need only have two translation programs.

In the preceding discussion, it has been presumed that each step in the translation process translated an entire document. However, in embodiments of the invention in which the intermediate document structure is sequential, it is possible to translate from the first structure to the intermediate structure to the second structure in a continuous process in which the document having the intermediate structure is translated into one having the second structure as fast as the document having the intermediate structure is produced. In the stand alone system of FIGS. 3 and 4, the two steps in the translation can be carried out by separate processes, one executing the extraction program and the other the composition program. In such a system there is no need for a separate document with the intermediate structure; instead, as A-I extraction program 309 executed by the first process outputs to I buffer 317, I-B composition program 311 executed by the second process reads from buffer 317 and outputs to buffer 403. When that buffer is full, program 311 outputs to document with structure B 401.

In the networked system of FIG. 5, A-I extraction program 309 executing in system 501 may output from buffer 317 directly to network 505, and I B composition program 311 executing in system 501 may place data received over network 505 directly into buffer 317. Again, there is no need for a document with the intermediate structure in storage 303 of either system 501 or system 503. Which of the possible implementations is employed in a given system depends on the characteristics of the system. For example, in a system in which speed of transfer across network 505 is not a limiting factor, or one in which the size of storage 303 is, the document with the intermediate structure may be output directly to network 505. If, on the other hand, the speed of transfer is a limiting factor or the size of storage 303 is not, the document with the intermediate structure may be output to storage 303 and from there to the network.

3. The Intermediate Document Structure in a Preferred Embodiment: FIG. 6

As previously indicated, the intermediate document structure in a preferred embodiment is sequential, i.e, the logical relationships between the components of the document are represented by the locations relative to each other of the components in the document structure. The intermediate document structure of a preferred embodiment is further distinguished by the fact that components of the document which are dependent from other components are nested within the components from which they are dependent.. Both of these characteristics may be seen in FIG. 6, which shows parts of the intermediate document structure for a simple document. FIG. 6 represents a single sequence of data. Thus, the points indicated by A—A in the first and second lines of the figure are the same. Wavy lines indicate that the document structure includes material between the wavy lines which has been omitted.

The major component of the embodiment of the intermediate structure shown in FIG. 6 is the segment. The intermediate structure for a document contains at a minimum a single segment. Components of the document may be represented by other segments, which are then nested in the segment representing the entire document. A segment may contain components other than segments. These components include the data codes, generally character codes, which represent the document contents, attributes, which specify modifications to the appearance of the text represented by a sequence of character codes, control specifiers, which indicate modifications which apply to a single point in the text represented by a sequence of character codes, and descriptors, which immediately follow the beginning of a segment, attribute, or control specifier and contain information concerning the segment, attribute, or control specifier to which they belong.

In a preferred embodiment, the beginning of each segment is represented by a segment start code and a segment type code indicating the type of the segment, and the end of each segment is represented by a segment end code and the segment type code for the segment. In FIG. 6, the segment which contains all of the other components of the document has the 'stream' type. The start of the segment is marked by start of segment (SOS) 605, which contains start segment code (SSC) 601 and segment type code (STC) 603 indicating the 'stream' type. The end of the stream segment is marked by the end of segment (EOS) 641 in FIG. 6. EOS 641 for the stream segment contains end segment code (ESC) 637 and a repetition of STC 603 indicating the stream type.

The stream segment contains a descriptor and a segment of the 'text' type. The descriptor contains administrative information about the document. Examples of such information include the name of the person who created the document, the name of the person who typed the document, the document's title, a description of its contents, and the document's classification, for example letter or memo. The descriptor begins with start of descriptor (SOD) 611 and ends with end of descriptor (EOD) 617. SOD 611 contains start descriptor code (SDC) 607 and descriptor type code (DTC) 609 identifyinq the descriptor type, and EOD 617 contains end descriptor code (EDC) 615 and a repetition of DTC 609. The area between SOD 611 and EOD 617 contains descriptor contents (DC) 613. In a preferred embodiment, all descriptors belonging to a segment must immediately follow that segment s SOS 605. Descriptors may not overlap and DC 613 may not contain a segment or another descriptor.

Segments of 'text' type contain the sequence of character or numeric codes which makes up the document and may also contain control specifiers, attributes, descriptors and other segments. SOS 605 for the text segment of FIG. 6 contains SSC 601 and STC 619 specifyinq the 'text' type, and EOS 639 for the text segment contains ESC 637 and STC 619 for the 'text' type. The sequence of character or numeric codes in the text segment is represented by text codes (TC) 621.

The text segment of FIG. 6 also contains an attribute and a control specifier. The attribute is a revision attribute which indicates that a sequence of characters has been revised. The attribute begins with start of attribute (SOA) 627 and ends with end of attribute (EOA) 635. In a preferred embodiment, SOA 627 contains start attribute code (SAC) 623 and an attribute type code (ATC), which indicates the type of the attribute. Here, ATC 625 indicates the 'revision' attribute. EOA 635 contains end attribute code (EAC) 633 and ATC 625. The attribute applies to all of the characters represented by the character codes occurring between SOA 627 and EOA 635. The actual effect of the attribute depends on the document structure of the document which is finally produced from the intermediate document structure. For example, in some documents, a bar may appear in the margin next to the text represented by the character codes to which the attribute applies. In others, the attribute may have no meaning and will be ignored in the translation process. As will be explained in more detail later, attributes may overlap or be nested within a segment, but may not extend across segment boundaries. All descriptors applying to an attribute immediately follow SOA 627 for the attribute.

Control specifier (CTL) 630 in the text segment of FIG. 6 specifies a page break at the point in the sequence of character codes at which CTL 630 occurs. CTL 630 consists of two parts: control code (CC) 629 indicating a control specifier, and control type code (CTC) 631 indicating the kind of control specifier. CTC 631 in FIG. 6 is for a page break. Other CTC codes may specify line breaks, tabs, indentations, and similar text formatting functions. A CTL 630 may be immediately followed by one or more descriptors further describing the formatting operation specified by CTL 630.

In a present embodiment, SSC 601, ESC 637, SDC 607, EDC 615, SAC 623, EAC 633, and CC 629 are distinct arbitrary 8-bit codes; the type codes indicated by STC, DTC, ATC, and CTC are distinct arbitrary 16-bit codes. In other embodiments, the codes may have different lengths. The character codes may belong to a set of character codes such as the ASCII, EBCDIC, or Wang Laboratories, Inc.'s WISCII character code set or code sets such as those for Prestel terminals The numeric codes may include codes used to represent fixed decimal values or floating point values. Other types of segment may have other kinds of codes representing the information they contain.

In a present embodiment of the text segment, confusion between the codes used to define segments, descriptors, attributes, and control specifiers and the codes used to represent data is avoided by means of a unique eight-bit identity code which specifies that the preceding eight bits are not to be interpreted as one of the codes which marks the beginning or end of a segment, attribute, descriptor, or control specifier, but instead as a data code. This technique is illustrated in FIG. 7, where TC 621 in the third portion of the segment shown in the figure contains a character code identical with SSC 601. That character code is followed by identity code (IDC) 707, which prevents the code from being interpreted as the start of a segment. Variations of the technique just described may be employed in other embodiments. For example, the order of the code identifying the component and the code identifying the component type may be reversed and the identity code may indicate that a following code is not to be interpreted as a type code.

An advantage of the intermediate document structure of the present invention is its adaptability. In a present embodiment, a document has five kinds of components: segments, descriptors, attributes, control specifiers, and data codes. However, segments, descriptors, attributes, and control specifiers are identified by means of 8-bit codes, and consequently, new kinds of components may be added without changing the basic nature of the document structure. The same is true with regard to new types of segments, attributes, descriptors, and control specifiers. The types of these components are specified by 16 bit codes, and thus, it is possible to have up to 2**16 different types of segment and the same number of types for the attributes, the descriptors, and the control specifiers. Such adaptability of the intermediate structure is required to deal with the progress of document processing technology. For example, originally, documents were composed only of text; however, as the technology of document processing has expanded, documents have come to include images and voice data, and the present invention includes segment types for voice data and images and for the the binary data representing a voice signal or an image. As other items are included in documents, corresponding segment types may be added to the intermediate structure.

4. Segment Types in a Present Embodiment: FIGS. 7 and 8

In a present embodiment, there are 11 segment types:

1. stream: the stream segment type represents an entire document and contains the segments representing the components of the document.

2. text: the text segment type represents the body of the text of the document.

3. header: the header segment type represents the page headers used in a document.

4. footer: the footer segment type represents the page footers used in a document.

5. note: the note segment type represents text which is a note to the makers of the document. Notes are printed only on request.

6. footnote: the footnote segment type represents the text of a footnote which refers to a point in the text corresponding to the location of the footnote segment.

7. shelf: the shelf segment type represents data which has been stored for later use in the document.

8. external reference: the external reference segment type represents information which is required for the document but not contained in the document. The contents of the external reference segment specify how the information referred to is to be located.

9. binary: the binary segment type contains information represented by binary data codes instead of character codes. In a present embodiment, the binary segment type contains the data used to represent images and voice signals.

10. image: the image segment type contains information required to interpret the binary data in a binary segment representing an image.

11. voice: the voice segment type contains information required to interpret the binary data in a binary segment representing voice data.

Of these types, the text, header, footer, note, footnote, and shelf segments in a present embodiment all represent text sequences, and consequently may contain TCs 621, attributes, and control specifiers. FIG. 7, showing a detailed representation of a text segment is exemplary for all of these segment types. The text segment of FIG. 7 represents text which begins with a title which is centered and underlined and which has been revised. The segment begins with SSC 601 and STC 619 specifying a text segment, contains CC 629 and CTC 702 specifying that the following text is to be centered, SAC 623 and ATC 625 specifying the beginning of a revised section of text, SAC 623 and ATC 703 specifying the beginning of a section of text which is underlined, attribute descriptor 711, specifying that the underline is to be a single underline and including SDC 607, DTC 709 indicating single underline, EDC 615, and DTC 709, TC 621 representing the sequence of characters in the title, EAC 633 and ATC 703 marking the end of the portion to be underlined, two occurrences of CC 629 and CTC 705 'return' marking the end of the title and a blank line following the title, TC 621 containing the text following the title, EAC 633 and ATC 625 marking the end of the portion of the text which was revised, additional TC 621, and ESC 637 and STC 619 specifying the end of the segment. As previously explained, IDC 707 and SSC 601 in the third line of the figure show how the identity code is used to distinguish data codes from those which indicate the start or end of a component of the document. FIG. 7 also shows how, as previously explained, attributes may overlap.

In a present embodiment, the text, header, footer, note, footnote, and shelf segment types all have the general form just presented; however, the header and footer segment types in a present embodiment may not contain other segments. There is no such restriction for the text, note, footnote, and shelf types. For example, a text segment may include a note or footnote segment, and if the text includes a picture, an image segment and a binary segment representing the image.

A segment of the external reference type has as its contents the information required to locate the external reference. For example, if the external reference is to another document, the external reference segment will contain the information which the document processing system requires to locate the other document.

In a present embodiment, a binary segment is always preceded by a segment specifying how the data contained in the binary segment is to be interpreted. Presently, such interpretive segments are either voice segments or image segments. Other embodiments may of course include other kinds of interpretive segments. FIG. 8 presents a detailed representation of one such combination of an interpretive segment with a binary segment. In that figure, the interpretive segment is a voice segment. The voice segment begins with SSC 601 and STC 801 for the voice type and ends with ESC 637 and STC 801 for the voice type. Its contents are the information required to properly interpret the contents of the binary segment. In a present embodiment, the contents of the voice segment include audio data type (ADT) 803, which specifies the type of audio data contained in the binary segment, V 805, specifying the version of that type, the digitization rate (DR) 807 for the audio data, and the length of time (T) 813 represented by the following binary data.

The binary segment begins with SSC 601 and STC 811 for the binary type and ends with ESC 637 and STC 811 for the binary type The contents of the segment include L 813, specifying the length of the data in bytes, and BC 815, containing the binary data codes. The contents of L 813 and BC 815 are interpreted solely as binary data, and consequently, a binary segment in a present embodiment cannot contain other segments, attributes, or control specifiers.

The relationship between the image segment and the binary segment containing the image data is substantially the same as that between the voice segment and the binary segment containing the voice data. In a present embodiment, the information used to interpret the image data includes image type, horizontal and vertical size, horizontal and vertical resolution, the encoding scheme, the version of the encoding scheme, the encoding parameter, a code indicating the hardware which was the source of the image, the display format, and the display color. In other embodiments, the binary segment may contain codes representing video images and the image data may include the information needed to produce a video image from those codes.

5. Attribute Types in a Present Embodiment

A present embodiment of the invention has 11 attribute types:

1. underscore: the underscore attribute indicates that the sequence of characters specified in the attribute is to be underscored.

2. script: the script attribute indicates that the specified sequence of characters is a subscript or superscript.

3. bold: the bold attribute indicates that the specified sequence is to be in bold face type.

4. optional: the optional attribute indicates that the specified sequence of characters is to be displayed or not as the user specifies.

5 no break: the no break attribute indicates that the specified sequence of characters will not be broken when lines are formatted.

6. strike through: the strike through attribute indicates that the characters in the specified sequence will be overstruck by a specified character.

7. table of contents: the table of contents attribute indicates that the characters in the specified sequence are to be included in the table of contents.

8. index: the index attribute indicates that the characters in the specified sequence ar to be included in the document's index.

9. revision: the revision attribute indicates that the text represented by the specified sequence has been revised.

10. reverse video: the reverse video attribute indicates that the characters in the specified sequence are to be displayed in a manner which is the reverse of that usually used.

11. italics: the italics attribute indicates that the characters in the specified sequence are to be in italics.

Several of the above attributes may have several variants. For example, in a present embodiment, underscore may specify one or two line underscore and script may specify a superscript or a subscript. As pointed out in the discussion of the text segment and shown in FIG. 7, a given variant is specified by means of an attribute descriptor 711 in the attribute

6. Control Specifier Types in a Present Embodiment

In a present embodiment, there are thirteen types of control specifiers. They are the following:

1. alignment: the text at the point of the control specifier is to be aligned on a character such as a decimal point, comma, or asterisk.

2. tab alignment: the text at the point of the tab alignment control specifier is to be aligned with the next tab stop.

3. indent alignment: the left margin at the point of the indent alignment specifier is temporarily reset a previously-specified amount.

4. center: the line following the control specifier is centered.

5. hard return: the hard return control specifier specifies a point at which the current line must end until the author of the document specifies otherwise.

6. soft return: the soft return control specifier specifies the point at which the current line ends as the document is currently formatted.

7. hard page: the hard page control specifier specifies the point at which the current page must end until the author of the document specifies otherwise.

8. soft page: the soft page control specifier specifies the point at which the current page ends as the document is currently formatted.

9. column: the column the point at which a column begins. Descriptors following the column control specifier specify the line spacing, line justification, lines per inch, and pitch in the column.

10. set format: the set format control specifier specifies the point at which a new format for the text begins. Descriptors following the set format specifier specify the new format. The descriptors may specify line spacing, settings for alignment, tabs, and indentation, and settings for centering, right justification, line justification, lines per inch, and pitch.

11. set character set: the set character set control specifier specifies the point in the text at which a new interpretation of the document's character codes begins. The interpretation is specified by a descriptor following the set character set control specifier.

12 merge: the merge control specifier indicates a point at which text characters from another document will be inserted into this document.

13. no merge: the no merge control specifier indicates a point at which no merging will be permitted.

As is apparent from the above descriptions, where a control specifier has a number of possible effects on the format of the document, the exact effects are specified by means of descriptors immediately following the control specifier.

7. Using Descriptors to Name Document Components: FIG. 7

In some prior art document structures, document components may have character-string names. The names may be used in various document processing operations to refer to the components. In a present embodiment of the intermediate document structure, a component's name is represented by a descriptor of the 'name' type. FIG. 9 shows how a descriptor of the name type may be used to represent the name of a text shelf segment. The descriptor follows immediately after STC 901 for the shelf and consists of SDC 607 DTC 903 for the 'name' type, a character sequence 905 representing the name, EDC 615, and DTC 'name' 903.

8. A Document with a Prior-art Structure and its Equivalent with the Intermediate Structure: FIGS. 10-11

The discussion next turns to a specific example of translation between a given document structure and the intermediate structure. There are first presented a document having a document structure of the type presently used in word processing and an equivalent document having the intermediate structure of the present invention. Thereupon, the methods by which the translations are accomplished are discussed.

FIG. 10 is an illustration of the document structure of the type presently used. The structure is made up of equal-sized numbered blocks in a file. The blocks have three different kinds of contents: administrative information about the document, indexes by means of which components of the document may be located, and the actual text of the documents. The administrative blocks are at fixed locations in the file. Blocks of other types may be anywhere in the file. Thus, except for the administrative blocks, there is no relationship between the location of a block in the file and its function in the document. Blocks are located in the file by means of pointers specifying block numbers. The pointers may be used to link blocks into chains and to form indexes by which the blocks may be located.

The document illustrated in FIG. 10 contains two pages of text and a named text shelf. Each page has a header and footer, and a portion of the text on one of the pages is underscored. The pages of text are contained in document body chain 1025. Document body chain 1025 consists of text blocks 1002. Each text block 1002 in the chain is linked by means of a pointer to the preceding and following block in the chain. The double linking makes it possible to move easily from one part of the document body to another.

The text blocks in the chain have two major components: the text portion (T) and the attribute portion (A). T contains character codes for the text of the document, codes representing tabs, indentations, page breaks, and the like, and special codes called attribute characters. The last character in T of each text block is a special etx character code indicating the end of T. In FIG. 10, attribute characters appear as AC 1033 and the etx character as etx 1031.

The A portion of a text block 1002 contains informational attributes and visual attributes. Each informational attribute corresponds to an attribute character and contains references by means of which other text blocks 1002 containing the information required for the informational attribute may be located. The information applies at the location in the text specified by the attribute character corresponding to the informational attribute. In FIG. 10, there are three format attributes (FA) 1035, each one specifying a format for text and corresponding to an AC 1033 in T of text block 1002 containing FA 1035. The visual attributes specify ranges of characters in the text to which a modification such as underlining or bold face type applies. In FIG. 10, there is one visual attribute, VA 1023, specifying which portion of the text is underlined.

Document body chain 1025 contains two pages of text. In the document structure of FIG. 10, each page must have a FA 1035. The FA 1035 specifies the page's format, any headers or footers for the page, and the fact that the AC 1033 corresponding to the FA 1035 also specifies the location of the beginning of a new page. The format, header, and footer are specified by means of references in FA 1035 to text block chains containing the information required for the format, header, and footer. Thus, FA 1035 in the first block (21) in page 1 1027 has three references, represented by FOR, HR, and FR. FOR refers to the text block (35) containing the page format, HR refers to the text block (12) containing the header, and FR refers to the text block (26) containing the footer. The first text block in page 2 1029 has the same informational attribute as the first text block in page 1 1027. In addition, text block (15) of that page contains VA 1023, the visual attribute indicating the par of the text which is underscored.

The chains of text blocks containing the header, footer, and format referred to in FA 1035 are each made up of only 1 block in the present example document. Text block (26) contains footer 1017, text block (12) contains header 1019, and text block 35 contains format 1021. Header 1019 and footer 1017 both have FAs 1035 containing the reference FOR referring to format 1021. Headers, footers, and text thus all share the same format. The final component of the document of FIG. 10, text shelf 1015, is made up of another chain of text blocks containing 2 blocks, (20) and (30).

The remaining parts of the document structure of FIG. 10 are four administrative blocks 1031 containing document info blocks 1001, document table (DT) 1003, and three index blocks 1033 including name index block (NIB) 1005, page index block (PIB) 1007, and reference index block (RIB) 1009 Document info blocks 1001 include administrative information about the document such as the document's title, creator, subject, size, and so forth. DT 1003 contains pointers to the document's indexes. P10 points to NIB 1005, P16 points to PIB 1007, and P40 points to RIB 1009. DT 1003 is always at a fixed location in the document structure, and consequently, any component of the document can be located by using DT to find the proper index and then using the index to locate the component.

The three index blocks correspond to three indexes: a name index by which a named component of the document may be located using the component's name, a page index by which individual pages of the document may be located, and a reference index by which chains containing information referred to by references in informational attributes may be located. In the document of FIG. 10, each of these indexes is contained in one index block: the name index in NIB 1005, the page index in PIB 1007, and the reference index in RIB 1009. In larger documents, an index may contain more than one index block.

The name index is made up of name index entries (NIEs) 1006. Each name index entry contains a name and a pointer to the first text block of the chain containing the named component. Thus, NIE 1006 in NIB 1005 contains P20 pointing to text block (20), the first text block in text shelf 1015. The page index in PIB 1007 is made up of page index entries (PIEs) 1008. Each PIE contains a page number and a pointer to the first text block for the page. The document of FIG. 10 has two pages, the first beginning on block (21) and the second beginning on block (9), and accordingly, the PIE for page 1 contains P21 and that for page 2 contains P9. The reference index in RIB 1009 is made u of reference index entries (RIEs) 1010. Each RIE contains a reference number (represented here by FOR, HR, and FR), and a pointer to the first block of the chain containing the reference, here block (35) for FOR, block (12) for HR, and block (26) for FR.

The components of the document structure and those of the intermediate document structure correspond as follows:

| Structure of FIG. 10 | Intermediate Structure |
| --- | --- |
| entire document | stream segment |
| document body chain 1025 | text segment |
| text shelf 1015 | text shelf segment |
| footer 1017 | footer segment |
| header 1019 | header segment |
| format 1021 | set format control specifier |
| tabs, page breaks, etc. | control specifiers |
| VA 1023 | attribute |
| Doc info blocks 1001 | descriptors |

The intermediate structure has no components corresponding to DT 1003 or the index blocks, since the relationship of the components to each other in the intermediate structure is determined by their positions relative to each other in the intermediate structure.

FIG. 11 shows the translation of the document of FIG. 10 into an equivalent document with the intermediate structure. That document begins with SOS for the 'stream' type 1101 and ends with EOS for the stream type 1151. Immediately following SOS 1101 are descriptors 110 containing the information from document information blocks 1001 of the FIG. 10 document. Then comes SOS 1105 for the 'text' segment for the contents of document body chain 1025, followed by PB CTL 1107, a page break control specifier marking the beginning of page 1, a set format control specifier 1109 and text format descriptors 1111 containing information as to how the text is to be formatted. The format described in text format descriptors 1111 remains in effect until another SF CTL 1109 occurs in the text segment. The information in descriptors 1111 is obtained from format 1021 of the FIG. 10 document. Following descriptors 1111 is a header segment for the page 1 header. The segment includes SOS 'header' 1113, SF CTL 1109 for the header format, header format descriptors 1115, header text 1117, and EOS 'header' 1119. Header text 1117 is obtained from header 1019, and header format descriptor from format 1021, as specified by FA 1035 in header 1019.

Next in the intermediate structure comes a footer segment for the page, containing SOS 'footer' 1121, SF CTL 1109, footer format descriptor 1123, footer text 1125, and EOS 'footer' 1127. Like a format, once a header or footer is established, it remains effective until a new one is established. Following the footer segment is page 1 text 1129. At the end of the text comes PB CTL 1107 for the page break at the end of the first page. Since page 2 has the same format, header, and footer as page 1, there is no for format, header, or footer segments. Next is page 2 text 1131, from page 2 1029. Page 2 1029 contains a visual attribute indicating an underscore, and consequently, included in page 2 text 1131 is an underscore attribute, which contains SOA 'underscore' 1133, an attribute descriptor 1135 indicating whether the underscore is single or double, the underscored portion of text 1131, and EOA 'underscore' 1139. Thereupon come ununderscored text 1131 and EOS 'text' 1141, marking the end of the text segment. The rest of the stream segment is occupied by the text shelf segment corresponding to text shelf 1015. That segment includes SOS 'shelf' 1143, a descriptor 1145 containing the shelf name (obtained from NIB 1005), the shelf content 1147, from the text blocks in text shelf 1015, and EOS 'shelf' 1149'. Following the text shelf segment and terminating the intermediate document structure is EOS 'stream' 1151.

9. Translation Methods

As may be seen by a comparison of FIGS. 10 and 11, relationships which are expressed by means of attributes, indexes, and pointers in the document structure of FIG. 10 are expressed by means of nested segments, attributes, and descriptors in the document structure of FIG. 11. Thus, in the document structure of FIG. 10, the fact that each page has an identical header is expressed by the fact that the reference HR appears in FA 1035 for each page, while the same fact is expressed in the document structure of FIG. 11 by placing a header segment in the text segment ahead of the text for the first page to which it applies.

In programming terms, what happens is that when AC 1033 is encountered in T of block (21), the processing of document body chain 1025 must be interrupted, FA 1035 must be examined, and if it specifies a page break, new header, new footer, or new format, a PB CTL 1107, a header segment, a footer segment, or a SF CTL 1109 and its associated descriptors 1111 must be placed in the intermediate structure. After that has been done, the processing of document body chain 1025 must be resumed. If, as is the case here, the header or footer referred to in FA 1035 itself has in its text an AC 1033 and that AC 1033 refers to another FA 1035 containing a reference (here the reference to format 1021, FOR), then the processing of the header or footer must be interrupted to process the chain of blocks referred to by that reference. The nested components of the intermediate document structure thus correspond to a processing sequence in which the processing of a given component of the document of FIG. 10 is begun, is interrupted when information from another component is required, and is resumed when the processing of the other component is complete.

In a present embodiment, the required processing sequence is achieved by means of a stack which is part of State Buf 319: when the processing of a first component is interrupted, state including the kind of component and the current location in the component is saved on the stack. Then the new component is located and processed. When the processing of the new component is complete, the saved state is restored from the stack and processing of the first component continues. Generally speaking, in the document structure of FIG. 10, an interruption or resumption of processing of a component involves a shift from one chain of text blocks to another.

FIG. 12 shows the main translation loop of a preferred embodiment of a translation program for translating the document structure of FIG. 10 into the intermediate document structure. During operation of the loop in a system such as that shown in FIG. 3, the portions of the document which are currently being translated are read from storage 303 into A buf 315; as the intermediate document is produced, it is written to I buf 317, and from there to storage 303. The portions of the program currently being executed are contained in code buf 321, and state buf 319 contains the stack, a position block indicating the location of the character currently being processed, a value indicating the kind of component being processed, the character currently being processed, and other values necessary for the operation of the program.

The loop begins with initialization block 1201. Procedures in that portion of the program output SOS 'stream' 1101 and then read the contents of doc info blocks 1001 and place descriptors 1103 containing the information from those blocks immediately after SOS 1101. Initialization continues by using DT 1003 to locate the first text block in document body chain 1025. Once the block is found, the program outputs SOS 'text' 1105 and begins to process the characters in T one at a time. Processing is done in the main translation loop.

On entering the main translation loop, two boolean variables, result and not$exhausted, are set to True (block 1203). As may be seen from decision block 1205, the main translation loop will continue to operate until either result or not$exhausted is false. result is set to False if any processing step in the main translation loop fails, and not$exhausted is set to False when the entire document has been translated. The again translation loop thus terminates either as a result of a failure in translation or upon completion of translation.

Translation then commences with the first character in T of the first text block in page 1 1027 and continues one character at a time (block 1209). As shown by block 1211, if the character being processed is any character other than etx 1031, it is processed by process char 1213. As will be explained in more detail later, if the character is a text character, processing of the current chain continues; if it is an AC 1033, state is saved and the next character processed by the main loop is the first byte from the corresponding informational attribute. If on of the bytes in the informational attribute is a reference to another text chain, the program saves state, outputs a code indicating the type of the chain it is processing, outputs the characters necessary to indicate the start of the new component being processed, and processing continues with bytes from the text chain referred to in the reference.

If the character is etx 1031, the end of T in a text block in the chain currently being processed has been reached. The manner in which processing continues is determined by whether the tex block is the last in a page, the last in a chain, or the last in a document. If the text block is not the last in a chain, it will contain a pointer to its successor; if the text block is the last on a page, the first character in the successor block will be an AC 1033 corresponding to a FA 1035 specifying a page break. When the text block is neither the last in a chain or the last on the page, processing continues with the first character of T in the successor block. (decision block 1215). When the text block is the last on a page (decision block 1225), that character will be AC 1033 corresponding to FA 1035 specifying the page break, and a PB CTL 1107 will be output in the course of processing the AC 1033. The program determines whether the text block is the last in the document is determined by examining the stack. If it is empty, there are no other chains to be processed and no more characters in the present chain. When the text block is the last in the chain, but not the last in the document (decision block 1217), processing of the component represented by the chain has been completed, and the program writes the codes necessary to end the component to the intermediate document (block 1218) and then restores the state saved when processing of the current chain began (block 1219). That state contains the location of the next character to be processed, and processing continues as described. If the text block is the last in the document, not$exhausted is set to F (block 1221), which terminates the main translation loop. On termination, the codes necessary to end the stream segment containing the document are output to the intermediate document.

Continuing with FIG. 13, which presents a detail of process char block 1213, the program first determines whether the character being processed is part of a sequence of text (decision block 1300). If it is, it determines whether the character is an AC 1033 (block 1301). If it is, the program saves the current state (block 1303) and resets the position block to indicate the beginning of the informational attribute associated with AC 1033 (block 1305). Thus, the next character fetched in the main loop is the first byte of the associated attribute. If the character is not an AC 1033, the program next determines whether it is a control character, i.e., whether it is a tab, indent, carriage return, or the like (block 1309). If it is, the program writes a control specifier corresponding to the control character to the document with the intermediate structure (block 1315). If it is not, the program examines the visual attributes associated with the character to determine whether they have changed (block 1311). If they have, it does the processing required to begin or end an attribute in the intermediate document and then outputs the character to the intermediate document (block 1313). Thereupon, the next character is fetched.

If the character is not part of the text, it is part of an informational attribute or some other non-textual entity such as a format. In that case, further processing depends on whether the character is a reference (block 1315). If it is, the current state is again saved and the position block is set to the start of the chain referred to by the reference (blocks 1323 and 1325). Thus, the next character processed by the main loop will be the first character of that chain. If the character is not a reference and the item currently being processed is not yet finished (decision block 1317), the character is processed as required for the item (block 1321). For example, if what is being processed is an informational attribute specifying a page break, the program will output a PB CTL 1107. If the item is finished, the program will restore the state saved when the processing of the item began (block 1319).

FIG. 14, finally, contains a detailed representation of the visual attribute processing performed in block 1311. In a present embodiment, the translation program receives attribute information about a character from the document of FIG. 10 in the form of a bit array indicating which attributes are on and which are off for that character. The translation program first compares the entire bit array associated with the current character with the entire bit array associated with the last character received from the block. If there is no change, the program goes directly to block 1313 (block 1401). If there has been a change, the program compares the two bit arrays bit by bit. If a bit in the array for the current character is the same as the corresponding bit in the array for the previous character, the program simply compares the next bits (block 1405); if they are not, the program determines from the comparison of the corresponding bits whether the visual attribute represented by the bits has been turned on or off (block 1409). In the former case, the program writes the codes necessary to start the attribute to the intermediate document (block 1411); in the latter, the program writes the codes necessary to end the attribute (block 1413).

A concrete example of how the program works is provided by the processing of page 1 1027. During initialization, the program examines DT 1003 to determine if there is a pointer to PIB 1007. If there is, there is text in the document, and the program outputs SOS 'text' 1105. Using PIE 1008 to page 1 of the document in PIB 1007, the program locates text block (21), the first block in page 1 1027, and begins processing the first character in the block. That character is AC 1033 corresponding to FA 1035, so the program saves state and begins processing FA 1035. FA 1035 specifies a page break, and consequently, PB CTL 1107 is output to the document with the intermediate structure. FA 1035 also specifies a new format, the one referred to by FOR. Consequently, process char 1213 again saves state, locates block (35) containing format 1021, sets the state to specify the first character in block (35) and that the chain being processed is a format chain, and outputs SF CTL 1109. The main translation loop then forms format descriptors as required by the text of block 35. When etx 1031 in block (35) is reached, the program responds as shown in FIG. 12 for an etx 1031 which is the last in a chain. In this case, a control specifier is being processed, and thus, no special end codes are required.

The program then restores the state saved when processing format 1021 began and resumes processing FA 1035. The next item is reference HR for header 1019, so the program again saves the current state, outputs SOS 'header 1113', and begins processing T in header 1019. The first character in T of header 1019 is, however, AC 1033 referring to FA 1035 in A of header 1019. This FA 1035 contains only the reference FOR to format 1021. Process char 1213 therefore again saves the current state, outputs SF CTL 1109 following SOS 'header' 1113, saves state again, produces header format descriptors 1115 from the text in format 1021, and restores state as previously described. Since there are no further items in FA 1035, state is again restored and the remaining characters in header 1019 are processed, to produce header text 1117. When etx 1031 in header 1019 is reached, state is again restored and processing of FA 1035 continues.

The next item in FA 1035 is FR, referring to footer 1017, which is processed in the fashion described for header 1019. When processing of footer 1017 is finished, processing of AC 1033 in block (21) is finished and the remaining text characters in the block and the remaining blocks of page 1 are processed to produce page 1 text 1129. When AC 1033 of block (9), the first block in page 2, is reached, FA 1035 in that block is processed. Since FA 1035 of block (9) specifies the same format, header, and footer as FA 1035 of block (21), there is no need to output a new SF CTL, header segment, or footer segment, and all that is output is PB CTL 1107 marking the end of page 1. Processing continues as described above until all of the components of the document have bee translated.

Translation from the intermediate structure to the document structure of FIG. 10 employs the same general methods as translation in the other direction. First, the document structure is initialized by setting up the administrative blocks and the first index blocks and loading doc info blocks 1001 with the information from doc info block descriptors 1103. Then the processing of the contained segments begins. Each segment corresponds to a different text chain in the document structure of FIG. 10, and consequently, each time the beginning of a segment is encountered, processing of the current chain must be interrupted and processing of a new chain commenced. Each time the end of a segment is encountered, processing of the chain corresponding to the segment containing the segment which ended must resume. Again, the program uses the technique of saving state on a stack each time processing is interrupted and restoring state each time processing of a segment terminates.

While a document translated from a given document structure into the intermediate document structure and then back to the original document structure will contain the same information as the original document, the final document structure may not be completely identical with the original document structure. For example, many of the text blocks of FIG. 10 contain attributes referring to a single header block 1019. In the intermediate document structure, a header segment is produced each time the header changes. The program which translates from the intermediate document structure to the structure of FIG. 10 may not check whether a given header segment is identical to a header segment which appeared previously in the document. If it does not perform such a check, the program will translate each header segment it encounters into a separate text block and the resulting document structure will contain more text blocks and RIEs 1010 than the original document structure.

AN IMPROVED INTERMEDIATE SPREADSHEET STRUCTURE

10. Introduction: FIG. 15

Further investigation of the intermediate document structure and the composition and extraction programs disclosed herein has shown that the intermediate document structure and the composition and extraction programs may be modified to permit translation of one type of spreadsheet to another type of spreadsheet.

Figure 15:
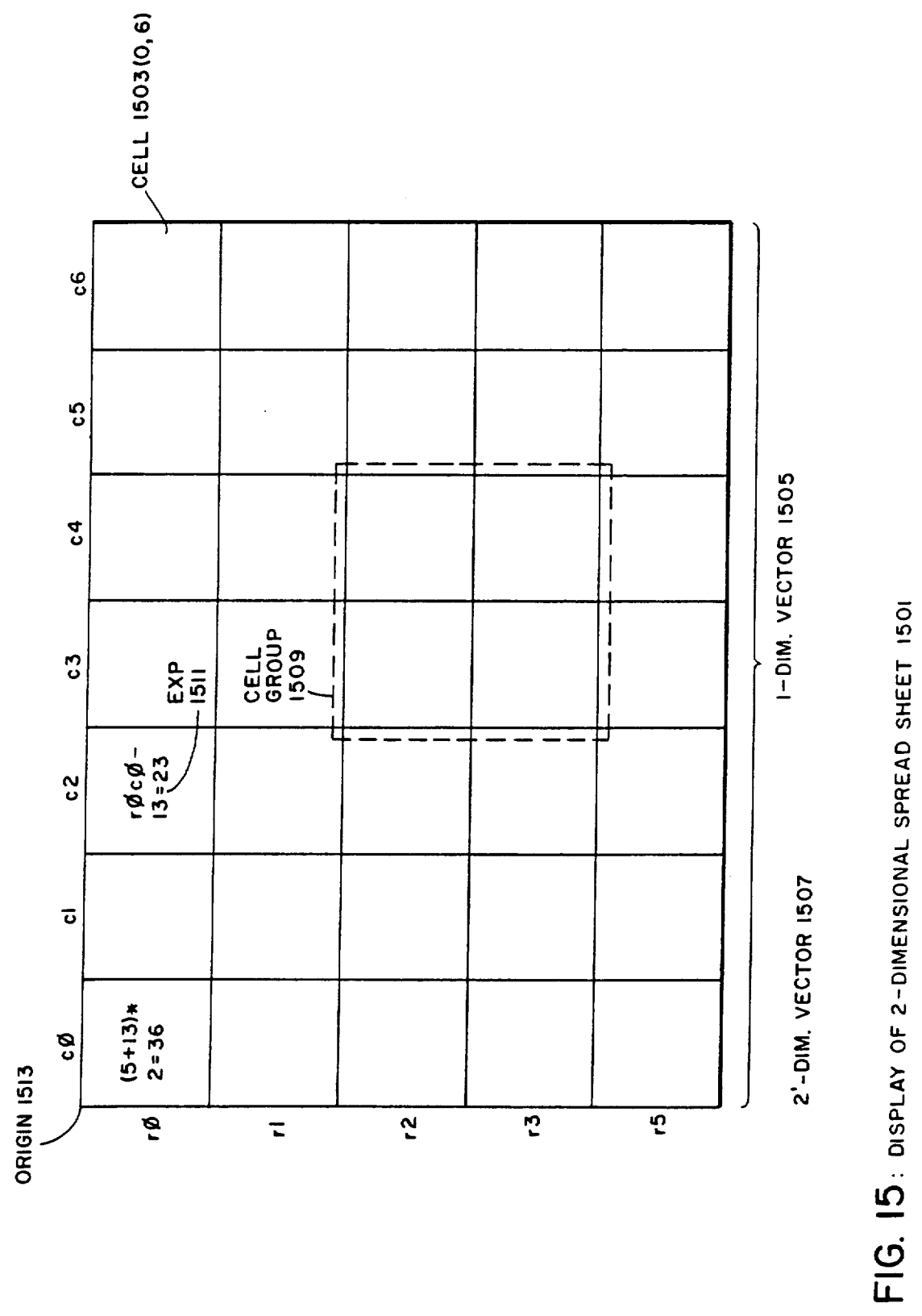

A spreadsheet is a representation in the memory of a computer system of the tabular display produced by a spreadsheet program. An example of such a tabular display is shown in FIG. 15. In the display, the spreadsheet appears as a matrix of cells 1503. Each cell 1503 is addressable by its row and column number. A user may enter expressions (EXP 1511) into the cells 1503. When a cell contains an expression 1511, the value of the cell is the current value of the expression 1511. The expressions may include operands such as constants or the addresses of other cells 1503 and operators indicating the operations to be performed on the operands. When an expression 1511 is entered into the display of cell 1503, the spreadsheet program immediately computes the expression's value and displays the value in the cell 1503. If the expression 1511 contains an operand which is the address of another cell, the spreadsheet program computes the value of the other cell and uses that value to compute the value of the expression. Similarly, when a user changes the value of a cell 1503 whose value is used to compute the values of other cells, the spreadsheet program immediately recomputes all of the other values. When a user is finished working on a spreadsheet, the spreadsheet program saves the representation of the spreadsheet in non volatile storage such as a disk drive.

As can be seen from the above description, spreadsheets resemble documents in that they are interactively produced by the user and then saved for later use. Spreadsheets further resemble documents in that there is a need to translate a spreadsheet produced by one spreadsheet program into a spreadsheet produced by another spreadsheet program. In the following, there is disclosed an intermediate spreadsheet structure which may be used with extraction and composition programs to translate one spreadsheet into another spreadsheet in a manner similar to that in which the intermediate document structure translates one document structure into another document structure.

11. The Spreadsheet model

Spreadsheets are usually 2 dimensional matrices of formulas. Such a spreadsheet may be seen as having elements with a maximum dimensionality of 2. The rows are elements with a dimensionality of 1 and the entire matrix is an element with a dimensionality of 2. However, spreadsheets having elements with dimensions greater than 2 are conceivable: spreadsheets with elements three or more dimensions, spreadsheets with only a single 1-dimensional element (a single row of cells), and so on. In fact, some presently available spreadsheets effectively have a maximum dimensionality of three. Such spreadsheets contain 2-dimensional elements called grids and the spreadsheet may be made up of multiple grids. To account for this, the spreadsheet model allows the definition of cells to occur in any number of dimensions. A simple way to view something n-dimensional is to view it one dimension at a time. At the lowest level of a Spreadsheet is Cell 1503 the placeholder for an expression. Cells are 0-dimensional: they are points of data.

A set of Cells organized into a row make up a 1-dim array of cells—a Vector 1505. The next dimension is made by lining up rows of cells one after another, forming a grid. The most consistant way to do that is to have a Vector 1507 that contains vectors, each of which contains cells. Further dimensions are made by nesting vectors.

The intermediate spreadsheet structure is shown in FIG. 16: cell 1503 is represented by a cell segment 1617. The row to which the cell belongs is represented by a 1-dimensional vector segment 1619: the matrix to which the cell and the row belong is represented by a 2-dimensional matrix segment 1627, and the entire spread sheet is represented by spreadsheet segment 1629. A Spreadsheet segment 1629 always contains a Vector segment 1619. In a 1-dim spreadsheet this vector contains a bunch of Cell segments 1617. In a 2-dim spreadsheet, this vector segment contains a bunch of vector segments 1619, which in turn contain cell segments.

Spreadsheet segment 1629 is optional. When used, it implies that the data being shipped is in fact a Spreadsheet; if the segment is not used, the data being shipped is merely data that fits nicely into the spreadsheet model, and can be used in any way desired.

In a preferred embodiment, the outermost vector segment of the intermediate spreadsheet structure (matrix segment 1627 in FIG. 16) must have a vector descriptor or 1607 specifying the number of dimensions in the spreadsheet. The interpretation of other descriptors depends on having this information. Nested vector segments MUST have a descriptor specifying the vector's dimensions IF the dimensionality is not exactly one less than their parent's dimensionality. Dimensionalities must decrease as nested vectors are entered, and no vector may have a 0 or negative dimensionality. Dimensions are ordered by assigning each dimension a number, and referring to the dimensions in decreasing order. The deeper a segment is nested, the more values are required for the current address.

12. Cell Addressing

There are two ways to specify the address of a cell or a square-edged group of cells, (cell group 1509 in FIG. 15) in any number of dimensions. If the group to be addressed is within the set of cells defined by the most recently opened segment, then local addressing can be used. If it is outside the most recently opened vector, global addressing must be used. There are separate descriptors for the different addressing modes.

Both provide a way to specify the address of a single cell 1503 or cell group 1509 in any number of dimensions. These are used. e.q, to assign a name to a rectangular region of cells. They are unusual descriptor groups because the order of descriptors within is meaningful.

Both follow the same basic pattern. For each dimension being expressed, a pair of descriptors is used (one of the descriptors is optional in certain cases). A group of cells is specified by identifying two opposite corners of the group of cells, two n-tuples. For example, cell group 1509 is identified by r2c3 and r3c4. From this, two descriptors are derived for each dimension, as shown in FIG. 17. The first descriptor 1703 is the initial value for the dimension and the second descriptor 1705 is this final value. Thus, for cell group 1509, the first description for the first dimension specifies 2 and the second 3, while the first descriptor for the second dimension specifies 3 and the second 4. Descriptors are ordered from the smallest to the greatest dimension.

While the {initial} descriptor is required, one for each dimension being expressed, the {final} descriptor is optional. If not given, the meaning implied is as if it existed and contained the same value as the associated {initial} descriptor. Thus, {initial 11} {initial 15} refers to the same cells as {initial 11}{final 11} {initial 15}{final 15}; they both refer to just one address, (11.15). In some applications, however, there is a distinction made between single cell referencing, and references to a group of cells in which the "group" happens to be a single cell. Because of this, a reference to a single cell is presumed to be a "single cell reference" if no {final} descriptors every appear in it, that is, if it is given the smallest representation possible. If any {final} descriptors appear, it is assumed that the reference is to a group of cells, even if the "group" contains exactly one cell. Thus, in some applications, {initial 11} {initial 15} may carry a subtly different meaning than {initial 11} {initial 15}{final 15}, even though the exact same cell and number of cells is referenced.

Global Cell Referencing

In global addressing, any cell in the spreadsheet can be referenced directly. An initial descriptor 1703 or initial and final descriptors 1705 are used for each of the dimensions, starting with dimension 0 and increasing. Global addressing could be used for any kind of reference; in practice local addressing is used where possible, because it is more compact. Global addressing is most commonly used in cell segments 1617, because global addressing allows addressing relative to the current position, and in cell segments 1617 the current position is always completely known, so local addressing could not address any other cell!.

The initial and final descriptors 1703, 1705 each have an absolute form and a relative form. The absolute form gives the position of the cell relative to origin 1513 of the spreadsheet. The relative form gives the position relative to the current position. Of course, that dimension of the current position must be determinate to be used as a base for relative addressing. Inside of Cell segments 1617, all n values of the address are known, so relative addressing could be used with any of the parts of an address.

Local Cell Referencing

Often, most all of the n-tuple making up an address are known: dimension descriptors in vector segments (except for the outermost one) specify the higher dimensions of an address. At the level of a Cell segment, all n values are known. Outside of Cells, though, addresses tend to be partially specified: the higher dimensions of an addresses are known (they are specified by enclosing Vector segments) but lower ones are not yet resolved. Local addressing treats the already defined, higher dimensional addresses as given and absolute, and just goes on to specify the lower addresses. This means that an address specified in local mode can only be used to reference cells defined within the vector segment the reference itself occurs in, and also that relative addressing is meaningless. Local addressing is very good for giving a group of cells within a vector some property, such as a collective name.

Things Common To Both Modes

It is meaningful—in either mode—not to fully resolve an address. That is, in a 3-dim vector, a group of cells might only give two dimensions worth of limits. Unspecified dimensions are presumed to include all possible addresses in the unspecified dimensions. Thus, when neither the initial or final descriptor appear, negative infinity is used for the initial address and positive infinity is used for the final address.

When it is necessary or desired to make explicit reference to an address infinitely far along a dimension, a special convention is used. Any descriptor for an absolute address (either initial or final) which contains no actual data is assumed to reference the addresses as far as possible from the origin in the appropriate direction. Note that when initial infinity is used, it means the SMALLEST possible address, while implicit or explicit final infinity refer to the GREATEST possible address.

It is illegal to specify more dimensions than exist in the spreadsheet in any cell address.

13. Contents of Cell Segment 1617: FIG. 18

If a spreadsheet cell is empty, cell segment 1617 representing it will have no contents. If the cell contains an expression, the contents of a spreadsheet cell segment 1617 will specify the expression, and if the expression has a present value, the contents will specify the present value and its data type. The manner in which these items are specified in a preferred embodiment is shown in FIG. 18. The first item is cell data type descriptor 1802, which specified the data type of the cell's present value. Cell data type descriptor 1802 consists of SOD 1801 and EOD 1805 for that type of descriptor and a type code (Data TC) 1805 for the value's type. The next item is expression control 1807, a CTL 630 which indicates that what follows is an expression 1831. Expression 1831 is represented by means of operand descriptors 1821 for the operands and an operator descriptor 1822 for the operator to be applied to the operands. In a preferred embodiment, postfix notation is used, i.e., operator descriptor 1822 follows the descriptors 1821 for all of its operands. Each operand descriptor contains SOD 1809 and EOD 1817 for an operand descriptor, a nested operand data type descriptor 1810, containing SOD 1811 and EOD 1815 for an operand data type descriptor and an operand data type code 1813 specifying the data type of the operand. Following the operand descriptor is the expression which defines the value of the operand (OP EXP) 1817. OP EXP 1817 may be a constant, the address of another cell, or a nested expression 1831. Expressions 1831 may be nested to any depth. Following operand descriptor 1821 come operand descriptors 1821 for any other operands required for the operation. Following all of the operand descriptors 1821 is operator descriptor 1822, which contains SOD 1823 and EOD 1827 for an operator and operator type code 1825. If the result of the expression was known when the intermediate document structure was created, result 1829 contains the value of the result.

As will be explained in more detail in the following, cell segment contents 1611 may include other descriptors which specify information including the represented cell 1503's address in its row, the cell's name, whether it is protected from modification, the data type required for its values, and the format for display of the cell.

14. Detailed Description of the Intermediate Spreadsheet Structure

The following is a detailed description of a presently-preferred embodiment of the intermediate spreadsheet structure. The following notation is used in this description:

| ( | SOS 605; | ) | EOS 639 |
|---|---|---|---|
| { | SOD 611 | } | EOD 617 |
| ! | CTL 630 | | |

The character string immediately following the left brace, left bracket, or ! indicates the name of the segment, descriptor, or control. In the case of descriptors, the value following the descriptor's name is descriptor type code (DTC) 609 for the descriptor; next comes the descriptor's content, expressed as a number and type of value. "*" indicates a variable number of values. For example,

| {absolute initial | 1 | 1:2 byte int} |
|---|---|---| defines a descriptor which specifies an absolute initial address in a dimension. 1 is the DTC 609 for the descriptor and 1:2 byte int indicates that the initial address is indicated by means of a single two-byte integer value. The description of each construct includes all of the other constructs which may be included in that construct. Which constructs are in fact included of course depends on the spreadsheet being translated. The term "group" in a construct indicates a group of descriptors which contain information of a kind set forth in the description of the construct. For example, a "cell reference descriptor group" is a set of descriptors which specifies a cell or group thereof.

The description also refers to vector segments and cell segments as "siblings" and "children" and to vector segments as "parents". This terminology has the usual meaning if a vector segment immediately contains other vector segments or cell segments, that vector segment is the parent of the immediately contained vector segments or cell segments and the immediately contained vector segments or cell segments are siblings of each other and children of the parent vector segment.

15. Expression Control 1807

The expression control is used to express any arithmetic, and some non-arithmetic, functions. In a preferred embodiment expression controls always represent functions that represent a single value; that is, no expressions return matrices of values. In other embodiments expressions may return matrices. Expressions might refer to a matrix of data, but they return a datum. Subexpressions can be nested within expressions; the method of representation is postfix. The term operator is used in the general sense; there can be SIN or LOG operators. Operators can take between 0 and an infinite number of operands; most operators expect a definite number, however. Specifying too few or two many results in undefined behaviour, which can include rejecting the expression as erroneous. Operands can be constants (of a variety of different datatypes), references to cells (or groups of cells), or expressions.

The descriptors belonging to the Expression control contain these Operators and Operands. The order of operands is always significant. The order might not be significant arithmetically, as in 3+7 versus 7+3; but the order of terms in the expression should be stored (if possible) in the order they were entered by the user.

The expression control uses a postfix conventions, with the curious adaptation that sub-expressions can be expressed by embedding another expression control in an operand. This makes absolutely no difference to the postfix expression; it just provides a way to express parenthesized expressions the way the user did. Of course, any expression can be laid out in "flat" postfix. But such nesting is useful when an operator takes a variable number of operands, such as Average(x, y, z, ...): in these cases, arguments and operator are put in a sub-expression, and the operator is assumed to consume all active operands. Note that "2 3+4 Average" is the average of 5 and 4 (4.5) not 2, 3, and 4 (3).

There are other cases in which emitting !expression within {operand} is recommended:

1) Whenever the operator is a function, especially one that might not be known where the stream is going. This is a good idea because, if the function is not known, an intelligent composition program will toss the subexpression but keep the rest intact. In any case, most functions take the form of a parenthesized expression (see reason 3).

2) Whenever it is positively known that the expression is corrupted. IF the corrupted part of the expression can be isolated in a subexpression, it can be better dealt with by the composition program.

3) Whenever parentheses were used when the expression was type in, (assuming it was typed in as infix). If the destination stores or displays the expression as infix, parentheses can then be reconstructed as they were entered. The expression will be correct whether this is done or not, but it is best to preserve the user's expression as he type it, when possible.

16. Address Descriptors 1701

| Global Cell Reference: | | |
|---|---|---|
| {absolute_initial} | 1 | 1:2 byte int} |
| {absolute_final} | 2 | 1:2 byte int} |
| {relative_initial} | 3 | 1:2 byte int} |
| {relative_final} | 4 | 1:2 byte int} |
| Local Cell Reference: | | |
| {absolute_initial} | 1 | 1:2 byte int} |
| {absolute_final} | 2 | 1:2 byte int} |

17. Datatype Descriptors 1802

Some segments have a "settable" datatype. In these cases, they have a default datatype, and can have a descriptor which sets the datatype. The descriptor contains the actual type code. A spreadsheet may have a datatype that is unknown to the extraction program: the "N/A" (not available) number element. These become ERROR datums, with an error code of 0.

18. Spreadsheet Segment 1629 and Spreadsheet Descriptors 1603

| (Spreadsheet | | no datatype |
|---|---|---|
| {grid flag | 2 | 1:boolean} |
| Whether grid lines are used to delimit cells from neighbors when cells are displayed. Applies to all dimensions. | | |
| {recalc count | 3 | 1:4 byte integer} |
| The number of times to iterate on cyclic references. The default is 0, implying that no recalc is done when cyclic references occur. | | |
| {recalc expression | 4 | None} |
| Contains an !expression which evaluates to TRUE (nonzero) while recalculation should continue. If none is given, defaults to FALSE, meaning no recalculation is performed. | | |
| {recalc dimension | 5 | *:2 byte enum} |
| Contains a list of priorities to obey while recalculating cyclic references. Each integer names a dimension to "sweep through" when doing recalculation: | | |
| 0 | | East/West |
| 1 | | North/South |
| 2 | | up/down (vertical) ... |

Thus, {recalc_dim 0 1} implies that recalculation is done by sweeping through rows, and within rows, downward through columns. Such sweeps occur from the lowest cell address to the highest; the default is to fill in missing dimensionalities with any values missing, in increasing order. However, if this descriptor does not appear, recalc is not done by sweeping dimensions at all.

| {last edit cell | 6 | local cell reference group} |
|---|---|---|
| Describes the address of the last cell to be modified. | | |
| {border display | 7 | *:boolean} |
| A boolean per dimension, indicating whether a border is displayed after the extreme cells along that dimension. The default is FALSE for each missing dimension. | | |
| {rule precidence | 8 | *:2 byte int} |
| What to do when the various rules specified to operate on on dimensions collide. For example, the stream might specify one set of rules for column x and another for row y. Where they intersect, the sets of rules collide. This establishes the ordering to apply to the sets of rules, in decreasing order of priority. | | |

19. Vector Segments and Vector Descriptors 1607

| (vector | | no datatype |
|---|---|---|
| {dimensionality | 1 | 1:2 byte int} |
| This descriptor must be the first descriptor in the outermost vector of the spreadsheet. The integer indicates the (nonnegative) number of dimensions to be expressed in this spreadsheet. Default is 0, which would be an empty spreadsheet. | | |
| {vector address | 1 | 1:2 byte int} |
| The address of this vector, as viewed by its parent. Meaningless on the outermost vector segment. Default is the previous sibling's address plus one, or if there is no previous sibling, the value of the parent's first child address. This allows empty vectors to be skipped easily. | | |
| {first child address | 2 | 1:2 byte int} |
| The smallest address in use among the children of this vector. Default is 0. | | |
| {cell name | 3 | group + *:text} |
| The name of a group of cells enclosed within this vector. The cells are named by the cell reference descriptor group within. If none appears, all cells enclosed by this vector are named. If multiple groups of cells are given the same name, the names references them all - even if they are disjoint. | | |
| {default cell protection | 4 | group + 1:bool} |
| The default protection of a group of cells enclosed within this vector; TRUE means protected. The cells are named by the cell reference descriptor group | | | within. If none appears, all cells enclosed by this
vector are affected.
{cell violation action        5      group + 1:1 byte enum}
The default action to take when a protected cell is
entered:
    −1  honor the protection; skip this cell
        when navigating.
     0  honor the protection.
     1  ignore the protection, allow the cell
       to be modified.
The cells are named by the cell reference
descriptor group within. If none appears, all cells
enclosed by this vector are affected.
{default cell format          6      none}
This contains two descriptors, each holding groups:
one to name a set of cells, and one to describe the
formatting to be applied to them:
{cell reference               1      group}
{cell format                  2      group}
{default display mult         7      group + 1:float_8}
The default value to multiply numeric values by
when displaying the value of a cell. This doesn't
change the cell's value, just the display. The
cells are named by the cell reference descriptor
group within. If none appears, all cells enclosed
by this vector are affected.
{default cell type            8      group + 2:1 byte enum}
The only data type legal in the named cells. If not
given, the default is that the cell may contain
instances of any datatype. The cells are named by
the cell reference descriptor group within. If none
appears, all cells enclosed by this vector are
affected. Note that this does not actually declare
a datatype for the purposes of parsing Cell
segments; in fact, a subsequent Cell segment under
the influence of this descriptor, could contain a
different datatype. This only affects what future
data might be added to the Cells.

20. Descriptors and Controls for Cell Segments 1617

(Cell
{cell address                 1      1:2 byte int}
The address of this cell, as viewed by its parent
vector. If this descriptor is missing, default is
the previous sibling's address plus one, or if
there is no previous sibling, the value of the
parent's first child address.
{cell name                    3      *:text}
The name of this cell.
{cell protection              4      1:bool}
The protection applied to this cell; TRUE means
protected.
{cell violation action        5      1:1 byte enum}
The default action to take when this cell (if
protected) is entered:
    −1  honor the protection; skip this cell
        when navigating.
     0  honor the protection.
     1  ignore the protection, allow the cell
       to be modified.
{cell format                  6      group}
This contains a group of descriptors which which
describe the display format for the cell. The cell
format group is described below.
{display mult                 7      1:float_8}
The default value to multiply numeric values by
when displaying the value of this cell. This
doesn't change the cell's value, just the display.
Default is no multiplier (1.0).
{cell type                    8      2:1 byte enum}
The only data type legal in this cell. If not
given, the default is that the cell may contain
instances of any datatype. Note that this does not
actually declare a datatype for the purposes of
parsing this segment; in fact, this cell could
contain a different datatype. This only affects
what future data might be added to the cell.
{datatype                     2      2:1 byte enum}
The datatype of the cell's current value. The
default is float_8. Note that this descriptor is
used to determine how to parse any data within the
current Cell Segment.
!Expression
  {operand                   1      1:float_8--settable}
  Operand descriptors may contain other descriptors
  including cell reference groups, a !Expression
  control, or a value. (operands containing multiple
  sources of values, such as both a cell reference
  and an expression control, are
  assumed to be order-irrevelant: a composing process
  can build an expression with them in any order.)
  Descriptors which may be contained in {operand} are:
  {global cell reference     1      global cell reference}
  {datatype                  2      2:1 byte enum}
  {operator                  2      1:2 byte enum}
  The operator to be applied to some preceeding
  number of postfix stack atoms, see the !Expression
  control explanation above for details.

The Format Descriptor Group

This holds the definition of a cell's format, which includes almost all the information required to display the cell's value. A cell can contain instructions for displaying a variety of kinds of data; it can offer one format for numbers and specify different directions in case it happens to contain a date, and so on.

Cell Display Format Descriptors

{display_data                 1      2:1 byte ints}
The first integer indicates whether the expression
contained by the cell is displayed, the second
whether the expression's value is displayed. If
neither is on, the cell will appear blank. The
values used are:
    −1  sometimes displayed: depends on the
        display software's view on what fits
        and would look nice.
     0  never displayed
     1  always displayed.
{display_repeat               2      1:1 byte bool}
Indicates whether the cell's content is displayed
repetitively until the cell's window is filled.
{extend_display               3      1:1 byte bool}
Indicates whether the cell's content is displayed
extending to the right, beyond the cell's boundary,
repeating as needed to cover blank cells, until a
cell is reached with its own display (or a border
is encountered). Note: if the cell is set to be
displayed with "centered alignment", content is
displayed extending downward, instead of to the
right, until a cell with its own display (or a
border) is reached.
{RID                          4      1:2 byte int}
This format's identifier.
{name                         5      *:text}
This format's name.

All the rest of the descriptors are used on a per-datatype basis, and are embedded in descriptors that represent that datatype. Each descriptor for a type may includes a group of descriptors defining how data of the type is to be displayed. The descriptors permitted in the group follow the descriptor for the type.

Format Descriptors for Numeric Values

{numeric format               6      group}
Format information for numeric display.
  {decimal point string 1         *:text}
  The characters to use as decimal point.
  {thousands separator 2          *:text}
  The string to use between digit-triples, indicating thousands. If not given, no characters are used to mark thousands.

{decimal places    3    1:1 byte int}
The number of decimal places to display, right of the decimal point. At display time, values should be rounded to accomodate this number of digits. The value 0 × 80 (negative 1 byte infinity) implies that rounding is only done as needed, for instance to fit a cell boundary. The value 0 × 7f is used to imply that special steps should be taken to present the number with all possible precision, for instance displaying the number as a fraction if possible.

{scientific    4    1:1 byte int}
Whether to use scientific format (nnE + mm) to express a number:
- −1    use scientific if it makes the display easier to read.
- 0    do not use scientific format.
- 1    always use scientific.

{currency flag    5    1:2 byte integer}
This indicates whether the value represents currency and should be displayed as such. In a preferred embodiment, 0 indicates that the number is not currency, and anything else indicates that it is. Specifically, −1 indicates that the currency type is unknown, and other values might be used to denote the particular currency type (US dollar, yen, etc.)

{currency string    6    *:text}
This indicates the string to prepend to the number to indicate that it is currency. If the currency string is given, it is ALWAYS applied, even if it conflicts with the content of the currency flag descriptor.

{percent flag    7    *:text}
Indicates that the number is to be displayed with the given string trailing; an indication that the value is a percentage (the string is generally "%"). This makes no assumptions about the value presented; the value .5 would be presented as .5%, not 50% (but see the multiplier descriptor).

{multiplier    8    1:float__8}
Indicates that the value should be multiplied by the given value before it is displayed. This does not change the cell's actual value; only the display is altered. Useful in conjunction with {percent}.

{positive prefix string    9    *:text}
A string to prepend to positive numbers at display time. Defaults to nothing. This prepend occurs after modifications made by other descriptors, e.g {currency}.

{negative prefix string    10    *:text}
Just like {positive prefix string}, except that the default is "—" if the descriptor doesn't appear at all.

{positive suffix string    11    *:text}
A string to append to positive numbers at display time. Defaults to nothing. This occurs after modifications made by other descriptors, e.g {percent}.

{negative suffix string    12    *:text}
Just like {positive suffix string}.

{alignment    13    1:1 byte int}
How to align the number within the cell:
- −1    Align in whatever way makes for the best display
- 0    No specific rule (use default or more global setting).
- 1    Left justify the number.
- 2    Center the value within the cell.
- 3    Right justify the number.

Format Descriptors for Dates and Times

{dates and times    7    group}
Format information for the display of dates and times.

{ordering    1    *:1 byte int}
This gives the order of fields for dates and times. If a field is not mentioned it is not displayed.
- 0    year
- 1    month
- 2    day
- 3    day of week
- 4    hour
- 5    minute
- 6    second
- 7    millisecond.

Thus, {0 2 1 3 4 5} implies that the date and time are displayed as Year Day Month Hour Minute Second and that milliseconds and the day of the week are not displayed. If the descriptor does not appear, the default is to display in whatever order seems best to the application; in the US, a common order would be 3 1 2 0 4 5. If the descriptor does appear but is empty, no date-time information can be displayed.

{year format    2    1:1 byte int}
This describes how the year is displayed:
- −1    Display however the appearance is the best.
- 0    Display according to defaults or more global rules
- 1    Display in short form (last 2 digits only)
- 2    Display in short form if the date is within 50 years.
- 3    Display in long form always
- 4    Display as a text string: 1991 becomes "one thousand nine hundred and ninety one"

{month format    3    1:1 byte int}
- −1    Display however the appearance is the best.
- 0    Display according to defaults or more global rules
- 1    Display as digits (1).
- 2    Display as abbreviated text (Jan).
- 3    Display as long text (January).

{day of week format    4    1:1 byte int}
- −1    Display however the appearance is the best.
- 0    Display according to defaults or more global rules
- 1    Display as digits (1). Monday is 1, Sunday is 0.
- 2    Display as abbreviated text (Mon).
- 3    Display as long text (Monday).

{day format    5    1:1 byte int}
- −1    Display however the appearance is the best.
- 0    Display according to defaults or more global rules
- 1    Display as digits (23).
- 2    Display as digits with textual postfix (23rd).
- 3    Display as text ("twenty third").

{hour format    6    1:1 byte int}
- −1    Display however the appearance is the best.
- 0    Display according to defaults or more global rules
- 1    Display as digits (12).
- 2    Display as text ("twelve").

{minute format    7    1:1 byte int}
- −1    Display however the appearance is the best.
- 0    Display according to defaults or more global rules
- 1    Display as digits (12).
- 2    Display as text ("twelve").

{second format    8    1:1 byte int}
- −1    Display however the appearance is the best.
- 0    Display according to defaults or more global rules
- 1    Display as digits (12).
- 2    Display as text ("twelve").

-continued

```
{millisecond format      9         1:1 byte int}
-1          Display however the appearance is the
            best.
 0          Display according to defaults or more
            global rules
 1          Display as digits (100).
 2          Display as fractions of a second. (1/10)
{padding string         10         *:text}
```
Characters are taken from this string as needed to
pad numeric displays out to the normal width, as in
1/23/91 to 01/23/91. Default is no padding
```
{field separator        11         *:text}
```
Repeated instances of this field indicate that
characters occur before the first field, between
the first and second field, between the second and
third field, and so on. If nothing is specified,
fields will be separated by a single space.
```
{alignment              12         1:1 byte int}
```
How to align the date within the cell:
```
-1          Align in whatever way makes for the
            best display (e.g., use the
            spreadsheet's default rule for
            displaying numbers.)
 0          No specific rule (use default or more
            global setting).
 1          Left justify the date.
 2          Center the value within the cell.
 3          Right justify the date.
```

Format Descriptors for Boolean Values

```
{boolean                8         group}
```
Format information for the display of Boolean
values.
```
{true string            1         *:text}
```
The string used to denote TRUE. Default is TRUE.
```
{false string           2         *:text}
```
The string used to denote FALSE. Default is FALSE.
```
{alignment              3         1:1 byte int}
```
How to align the Boolean within the cell:
```
-1          Align in whatever way makes for the
            best display (e.g., use the
            spreadsheet's default rule for
            displaying numbers.)
 0          No specific rule (use default or more
            global setting).
 1          Left justify the text.
 2          Center the text within the cell.
 3          Right justify the text.
```

Format Descriptors for Text

```
{text                   9         group}
{capitalization         1         1:1 byte int}
-1          Force upper case
 0          Leave case alone
 1          Force lower case.
{alignment 2 1:1 byte int}
```
How to align the boolean within the cell:
```
-1          Align in whatever way makes for the
            best display (e.g., use the
            spreadsheet's default rule for
            displaying numbers.)
 0          No specific rule (use default or more
            global setting).
 1          Left justify the text.
 2          Center the text within the cell.
 3          Right justify the text.
```

Operators for !Expression

The operators used in a preferred embodiment. Note that an operator with a variable number of operands must be used in a subexpression (unless it happens to be the last operator in the expression). The postfix a b - is taken to mean (a—b).

| Operation Code | # of Operands | Operation Definition |
|---|---|---|
| -1 | variable | Unknown. Used for cases where the extraction program is unable to find a definition for the function, or in cases in which the expression is obviously damaged. A compostion program treats this as it treats any unrecognised operator code, by tossing part or all of the expression away. |
| 0 | 1 | Unary Plus (no operation, result is operand). |
| 1 | 1 | Unary subtract (negate) |
| 2 | 2 | Binary addition |
| 3 | 2 | Binary subtraction |
| 4 | 2 | Binary multiplication |
| 5 | 2 | Binary division. The result is not necessarily integral. |
| 6 | 2 | raise to a power (a to the bth power) |
| 7 | 2 | Remainder of division (modulus) |
| 8 | 1 | Absolute value |
| 9 | 1 | Factorial. |
| 10 | 2 | Ceiling. The value a is expanded to decimal, and a ceiling operation is done at decimal position b, with digits to the left of the decimal point being positive. The ceiling operation acts to increase the value of a or leave it unchanged. Ceiling( ). Examples: 1.39 −1 Ceil yields 1.4 −3.229 −2 Ceil yields −3.22 113.4 2 Ceil yields 200 −3.100 −1 Ceil yields −3.1 |
| 11 | 2 | Floor. The value a is expanded to decimal, and a floor operation is done at the decimal position specified by b, as in Ceiling. Floor decreases the value or leaves it unchanged. 1.39 −1 Floor yields 1.3 −3.229 −2 Floor yields −3.23 113.4 2 Floor yields 100 −3.100 −1 Floor yields −3.1 |
| 12 | 2 | Truncate. The value a is expanded to decimal, and any digits right of the bth digit are discarded, counting digits as in floor and ceiling. 1.39 −1 Trunc yields 1.3 −3.229 −1 Trunc yields −3.2 133.4 2 Trunc. yields 100 −3.100 −1 Trunc yields −3.1 |
| 13 | 2 | Round. The value a is expanded to decimal, and the value is rounded at the bth digit. 1.39 −1 Round yields 1.4 1.34 −1 Round yields 1.3 −3.229 −2 Round yields |

-continued

| Operation Code | # of Operands | Operation Definition |
|---|---|---|
|  |  | −3.23 |
|  |  | 133.4 2 Round yields 100 |
|  |  | −3.100 −1 Round yields |
|  |  | −3.1 |
|  |  | The result at halfway points is indeterminate, as some machines will tend to round upwards always, and others might round up in some circumstances and round down in others. |
| 14 |  | reserved for Round Outward (if it is ever needed). |
| 15 | 2 | Random value between a and b inclusive, allowing non-integers, with equal probability. b must be greater than or equal to a. |
| 16 | 2 | Inequality. TRUE if a <>b. |
| 17 | 2 | Equality. TRUE if a == b. |
| 18 | 2 | Less than. TRUE if a < b. |
| 19 | 2 | Greater than TRUE if a > b. |
| 20 | 2 | Less than or Equal to. TRUE if a <= b. |
| 21 | 2 | Greater than or equal to. TRUE if a >= b. |
| 22 | 2 | Logical Or. |
| 23 | 2 | Logical Exclusive Or. |
| 24 | 2 | Logical And |
| 25 | 1 | Logical Not |
| 26 | 2 | Logival Equivalence |
| 27 | 2 | Logical Implication |
| 28 | 3 | If. Given "a b c if", the value returned is b if a is TRUE (nonzero) and c otherwise. |
| 29 | 1 | exponent, e to the ath power. |
| 30 | 1 | log of a, base e. |
| 31 | 2 | log of a, base b. |
| 32 | 1 | square root. |
| 33 | 2 | bth root of a. |
| 34 | 1 | sign (−1, 0, 1) |
| 35 | 1 | radians to degrees |
| 36 | 1 | degrees to radians |
| 37 ... 61 | 1 | sine, tangant, secant, *2 for co-, *2 for arc−, *2 for hyperbolic: 24 functions. |
| 62 | 2 | arctangent2 |
| 63 | 2 | hyperbolic arctangent2 |

Other embodiments may have different sets of operators.

21. Intermediate Form for the Spreadsheet of FIG. 19

FIG. 19 shows a simple spreadsheet display consisting of a single row with three columns. The first cell of the row contains an expression whose operands are constants; the third cell contains an expression, one of whose operands is the address of the first cell. The value of the first cell, 36, is used in computing the value of the third cell, 23. The intermediate spreadsheet structure representing the spreadsheet of FIG. 19 is printed below, using the following notation. The comments are of course not part of the intermediate spreadsheet structure:

```
(x       SOS 605 for segment x
)        EOS 639, sometimes shown as )x for clarity
{y       SOD 611 for descriptor y
}        EOD 617, sometimes shown as }y for clarity
!        CTL 630
a@b      integer value a, expressed in b bytes, a decimal
         value
0a@b     integer value a, expressed in b bytes, a
         hexadecimal value
;        comments
```

INTERMEDIATE SPREADSHEET STRUCTURE

```
(spreadsheet              ;start of
                          ;spreadsheet
  (vector                 ;outermost
                          ;vector begins
    {dimensionality       ;this vector
      2@2                 ;represents dim 2
    }
    {first-child-address  ;the first inner
      1@2                 ; vector will have
                          ; an address of 1
    }                     ; (hence, row 1)
    (vector               ;inner vector
                          ; begins. It has
                          ; address 1
                          ; (because the
                          ; first child
                          ; address of the
                          ; parent says so)
                          ; and a dim of 1
                          ; (because the
                          ; parent dim is 2,
                          ; and this doesn't
                          ; say otherwise.)
      (cell               ;start of cell
        {datatype
          0102@2          ;cell contains a
        }                 ; 2 byte integer
                          ; address of cell
                          ; is r1c0, since it
                          ; didn't say
                          ; otherwise.
        !expression       ;cell contains an
                          ; expression:
        {operand
          {datatype
            0102@2
          }
          5@2             ;2 byte int: 5
        }operand
        {operand
          {datatype
            0102@2
          }
          13@2            ;2 byte int: 13
        }
        {operator
          2@2             ;plus
        }
        {operand
          {datatype
            1@2
          }
          2@2             ;2 byte int: 2
        }
        {operator
          4@2             ;multiply
        }                 ;formula is 5 13
                          ; + 2 *, or
                          ; (5 + 13) * 2.
        36@2              ;cell result is 36
      )cell
      (cell               ;start of new cell
        {cell_address
          2@2             ;address of this
        }                 ; cell is r1c2
        {datatype
          0104@2          ;it contains a 4
        }                 ; byte integer
                          ; result
        23@4              ;content of cell
                          ; is 23
        !expression       ;cell contains an
                          ; expression
        {operand
```

```
             -continued
{datatype
   0001@2              ;this operand
                       ; contains no
                       ; constant,
}                      ;hence datatype
                       ; Unknown.
{cell_reference        ;this operand is a
                       ; cell reference
  {absolute_initial
     1@2               ;first address is
                       ; 1, ie, row 1
  }
  {absolute_initial
     0@2               ;next is 0, so
                       ; reference is to
                       ; r1c0
  }
}cell_reference        ;reference is to a
                       ; single cell
}operand
{operand               ;next operand
  {datatype
     0102@2            ;a 2 byte integer
  }
  13@2                 ;value of operand
                       ; is 13
}
{operator
   2@2                 ;subtract
}
                       ;formula is r1c0
                       ; 13 -, or r1c0-13
)cell                  ;end of 2nd cell
)vector                ;finishing up
)vector
)spreadsheet
```

22. Conclusion

The foregoing Description of a Preferred Embodiment has disclosed an intermediate spreadsheet structure which employs the same principles as the intermediate document structure to represent a spreadsheet being exchanged among spreadsheet programs. As shown in the Description, the intermediate spreadsheet structure can represent spreadsheets having any number of dimensions, can describe cell addresses, can describe the values of cells and the formulas used to obtain them, and can describe how the spreadsheet and the contents of its cells are to be displayed. The use of descriptors and control codes within segments, the nesting of cell segments in a first-dimension segments and the nesting of segments for the (n-1)th dimension in segments for the nth dimension provide the ease of processing, flexibility, and expandability characteristic of the intermediate document structure.

The preferred embodiment of the intermediate spreadsheet structure disclosed herein is, however, only one possible embodiment thereof. For example, the basic structure of the intermediate spreadsheet may be maintained while employing different conventions regarding the codes which begin and end segments and descriptors and specify control specifiers. Further, the intermediate spreadsheet structure of the present invention is inherently expandable, and consequently, new descriptors or operators may be added. Thus the preferred embodiment disclosed herein is to be considered in all respects illustrative and not restrictive, the scope of the invention being indicated by the appended claims rather than the foregoing description, and all changes which come within the meaning and range of equivalency of the claims are intended to be embraced therein.

What is claimed is:

1. A data processing system comprising:
   a) a memory having instructions and a data processing representation of a spreadsheet structure stored therein;
   b) a processor responsive to the instructions stored in said memory for converting the representation of a spreadsheet structure from a source form into a destination form, said representation of the spreadsheet structure having elements of at least one dimension, wherein the elements include a plurality of cells for holding information, said processor and instructions comprising:
      a first converter for converting the source form of the representation of the spreadsheet structure into an intermediate form, said intermediate form of the representation of the spreadsheet structure comprising:
         a cell segment for representing each non-empty cell in the spreadsheet structure;
         a first-dimensional vector segment for representing a first-dimensional element of the spreadsheet structure and which contains cell segments for any non-empty cells belonging to that element; and
         for each additional dimension, m, of the spreadsheet structure, a vector segment for non-empty element of that dimension which represents the non-empty element and which contains vector segments for non-empty elements of the (m-1)th dimension of the spreadsheet structure;
      a second converter for converting the intermediate form of the representation of the spreadsheet structure into a destination form of the representation of the spreadsheet structure and for storing said destination form of the representation of the spreadsheet structure into said memory.

2. A data processing system as recited in claim 1 wherein certain of the segments in the data processing representation include descriptors describing the contents of the segment.

3. A data processing system as recited in claim 2 wherein a descriptor of the data processing representation of the spreadsheet structure may contain another descriptor, and each descriptor includes a cell reference descriptor for describing a location in the spreadsheet structure of one or more of the cell segments, and the cell reference descriptor contains one or more address descriptors for describing segment addresses.

4. A data processing system as recited in claim 3 wherein
   the address descriptors of the data processing representation of the spreadsheet structure include global address descriptors;
   and certain of the cell reference descriptors contain global address descriptors ordered by dimension for a given cell segment and for every vector segment which contains the given cell segment.

5. A data processing system as recited in claim 3 wherein
   the address descriptors of the data processing representation of the spreadsheet structure include local cell descriptors; and
   certain of the cell reference descriptors contain local address descriptors specifying only the address of the cell segment in the immediately containing vector segment.

6. A data processing system as recited in claim 2 wherein the descriptors of the data processing representation of the spreadsheet structure include a group descriptor for defining a group of cells; and the group descriptor contains, for certain dimensions of the spreadsheet structure, address descriptors describing vertices of the group in each of the certain dimensions.

7. A data processing system as recited in claim 6 wherein the group descriptor is contained in other descriptors including a name descriptor which defines the name of the group described in the contained group descriptor and a default descriptor which specifies default information for the cells within the group.

8. A data processing system as recited in claim 1 wherein certain of the cell segments of the data processing representation of the spreadsheet structure contain a representation of an expression, and the representation of the expression includes an expression control marking the beginning of the representation and at least one operand descriptor describing an operand in the expression.

9. A data processing system as recited in claim 8 wherein the representation of the expression may further include an operator descriptor describing an operation to be performed on the operand.

10. A data processing system as recited in claim 9 wherein an operand descriptor of the data processing representation of the spreadsheet structure may further contain another representation of an expression, whereby expressions may be nested to any depth.

11. A data processing system as recited in claim 1 wherein certain of the cell segments contain a representation of an expression and a current result from evaluation of the express.

12. A data processing system as recited in claim 11 wherein the cell segments that contain the current result from evaluation of the expression also contain an indicator of the date type of the current result.

13. A data processing system as recited in claim 1 wherein the intermediate spreadsheet structure is of a form non-specific to a program that created the source spreadsheet structure.

14. A data processing system as recited in claim 1 wherein the processor is programmed to read the data processing representation of the spreadsheet structure from the memory so that the data processing representation may be interchanged with other data processing systems.

15. A data processing system as recited in claim 1 wherein each segment begins with a start indicator indicating both a start and a type of the segment, and each segment ends with an end indicator indicating an end of the segment.

16. In a data processing system, a method of converting a representation of a spreadsheet structure from a source form into a destination form, comprising the steps of:

a) converting the source form of the representation of the spreadsheet structure into an intermediate form, said intermediate form of a representation of the spreadsheet structure comprising:

a cell segment for representing each non-empty cell in the spreadsheet structure;

a first-dimensional vector segment for representing a first-dimensional element of the spreadsheet structure and which contains cell segments for any non-empty cells belonging to that element; and for each additional dimension, m, of the spreadsheet structure, a vector segment for each non-empty element of that dimension which represents the non-empty element and which contains vector segments for non-empty elements of the $(m-1)$th dimension of the spreadsheet structure; and b) converting the intermediate form of the representation of the spreadsheet structure into a destination form of the representation of the spreadsheet structure.

* * * * *